(12) United States Patent
Donath et al.

(10) Patent No.: US 7,375,728 B2
(45) Date of Patent: May 20, 2008

(54) VIRTUAL MIRROR

(75) Inventors: Max Donath, St. Louis Park, MN (US); Craig R. Shankwitz, Minneapolis, MN (US); Pi-Ming Cheng, Roseville, MN (US); Sameer Pardhy, Shoreview, MN (US)

(73) Assignee: University of Minnesota, Minneapolis, MN (US)

( * ) Notice: Subject to any disclaimer, the term of this patent is extended or adjusted under 35 U.S.C. 154(b) by 1127 days.

(21) Appl. No.: 09/968,724

(22) Filed: Oct. 1, 2001

(65) Prior Publication Data

US 2003/0128182 A1 Jul. 10, 2003

(51) Int. Cl.
*G06T 15/00* (2006.01)

(52) U.S. Cl. .................. 345/427; 348/118; 707/104

(58) Field of Classification Search ........... 345/419, 345/427, 660, 473, 973, 701, 707, 712, 771, 345/952, 702; 434/69; 348/118, 148; 340/435, 340/438; 359/13
See application file for complete search history.

(56) References Cited

U.S. PATENT DOCUMENTS

| | | | | |
|---|---|---|---|---|
| 2,494,064 A | 1/1950 | Simons et al. ............ 570/176 |
| 4,120,566 A | 10/1978 | Sanci et al. ............ 350/302 |
| 5,203,923 A | 4/1993 | Hartman ............ 118/669 |
| 5,214,757 A | 5/1993 | Mauney et al. ............ 395/161 |
| 5,231,379 A | 7/1993 | Wood et al. ............ 340/705 |
| 5,289,321 A | * | 2/1994 | Secor ............ 359/896 |
| 5,291,338 A | 3/1994 | Bezard et al. ............ 359/859 |
| 5,381,338 A | 1/1995 | Wysocki et al. ............ 364/449 |
| 5,414,439 A | 5/1995 | Groves et al. ............ 345/7 |
| 5,444,442 A | 8/1995 | Sadakata et al. ............ 340/916 |
| 5,497,271 A | 3/1996 | Mulvanny et al. ............ 359/631 |
| 5,499,325 A | 3/1996 | Dugan, Jr. ............ 395/132 |
| 5,517,419 A | 5/1996 | Lanckton et al. ............ 364/449 |
| 5,529,433 A | 6/1996 | Huynh et al. ............ 404/94 |
| 5,543,789 A | 8/1996 | Behr et al. ............ 340/995 |
| 5,599,133 A | 2/1997 | Costello et al. ............ 404/72 |
| 5,602,741 A | 2/1997 | Talbot et al. ............ 364/449.7 |
| 5,615,023 A | * | 3/1997 | Yang ............ 359/13 |
| 5,652,705 A | 7/1997 | Spiess ............ 364/436 |
| 5,670,935 A | * | 9/1997 | Schofield et al. ............ 340/461 |
| 5,721,685 A | 2/1998 | Holland et al. ............ 364/449.1 |
| 5,734,358 A | 3/1998 | Sumiyoshi ............ 345/7 |
| 5,761,630 A | 6/1998 | Sekine et al. ............ 701/301 |
| 5,765,116 A | 6/1998 | Wilson-Jones et al. ............ 701/41 |

(Continued)

FOREIGN PATENT DOCUMENTS

EP 0539989 5/1993

(Continued)

OTHER PUBLICATIONS

Course Notes, "Programming With OpenGL: Advanced Techniques" ACM SIGGRAPH 1997 pp. 1-3, 83-102.*

(Continued)

*Primary Examiner*—Phu K. Nguyen
(74) *Attorney, Agent, or Firm*—Westman, Champlin & Kelly, P.A.

(57) ABSTRACT

A virtual mirror is rendered by a computer graphics display or screen. The display substantially replicates the optical properties of a physical mirror. The display is provided on a host vehicle.

68 Claims, 23 Drawing Sheets

U.S. PATENT DOCUMENTS

| | | | |
|---|---|---|---|
| 5,808,566 A | 9/1998 | Behr et al. | 340/995 |
| 5,826,212 A | 10/1998 | Nagai | 701/208 |
| 5,848,373 A | 12/1998 | DeLorme et al. | 701/200 |
| 5,872,526 A | 2/1999 | Tognazzini | 34/961 |
| 5,910,817 A | 6/1999 | Ohashi et al. | 348/159 |
| 5,926,117 A | 7/1999 | Gunji et al. | 340/988 |
| 5,949,331 A | 9/1999 | Schofield et al. | 340/461 |
| 5,951,620 A | 9/1999 | Ahrens et al. | 701/200 |
| 5,953,722 A | 9/1999 | Lampert et al. | 707/100 |
| 5,966,132 A * | 10/1999 | Kakizawa et al. | 345/419 |
| 5,978,737 A | 11/1999 | Pawlowski et al. | 701/301 |
| 5,999,635 A | 12/1999 | Higashikubo et al. | 382/104 |
| 5,999,878 A | 12/1999 | Hanson et al. | 710/208 |
| 6,038,496 A | 3/2000 | Dobler et al. | 701/3 |
| 6,038,559 A | 3/2000 | Ashby et al. | 707/4 |
| 6,047,234 A | 4/2000 | Cherveny et al. | 701/200 |
| 6,049,295 A | 4/2000 | Sato | 340/928 |
| 6,104,316 A | 8/2000 | Behr et al. | 340/995 |
| 6,107,944 A | 8/2000 | Behr et al. | 340/995 |
| 6,111,498 A * | 8/2000 | Jobes et al. | 340/438 |
| 6,122,593 A | 9/2000 | Friederich et al. | 701/202 |
| 6,144,335 A | 11/2000 | Rogers et al. | 342/357.03 |
| 6,157,342 A | 12/2000 | Okude et al. | 342/357.13 |
| 6,161,071 A | 12/2000 | Shuman et al. | 701/48 |
| 6,166,698 A | 12/2000 | Turnbull et al. | 343/713 |
| 6,184,823 B1 | 2/2001 | Smith et al. | 342/357.13 |
| 6,188,957 B1 | 2/2001 | Bechtolsheim et al. | 701/209 |
| 6,192,314 B1 | 2/2001 | Khavakh et al. | 701/209 |
| 6,208,927 B1 | 3/2001 | Mine et al. | 701/70 |
| 6,208,934 B1 | 3/2001 | Bechtolsheim et al. | 701/209 |
| 6,212,474 B1 | 4/2001 | Fowler et al. | 701/211 |
| 6,218,934 B1 | 4/2001 | Regan | 340/438 |
| 6,226,389 B1 | 5/2001 | Lemelson et al. | 382/104 |
| 6,249,742 B1 | 6/2001 | Friedrich et al. | 701/202 |
| 6,253,151 B1 | 6/2001 | Ohler et al. | 701/208 |
| 6,268,825 B1 | 7/2001 | Okada | 342/357.13 |
| 6,272,431 B1 | 8/2001 | Zamojdo et al. | 701/211 |
| 6,278,942 B1 | 8/2001 | McDonough | 701/210 |
| 6,289,278 B1 | 9/2001 | Endo et al. | 701/208 |
| 6,298,303 B1 | 10/2001 | Khavakh et al. | 701/209 |
| 6,308,177 B1 | 10/2001 | Israni et al. | 707/100 |
| 6,314,365 B1 | 11/2001 | Smith | 701/200 |
| 6,314,367 B1 | 11/2001 | Ohler et al. | 701/208 |
| 6,320,612 B1 * | 11/2001 | Young | 348/148 |
| 6,361,321 B1 * | 3/2002 | Huston et al. | 434/69 |
| 6,370,261 B1 | 4/2002 | Hanawa | 382/104 |
| 6,370,475 B1 | 4/2002 | Breed et al. | 701/301 |
| 6,381,603 B1 | 4/2002 | Chan et al. | 707/10 |
| 6,385,539 B1 | 5/2002 | Wilson et al. | 701/213 |
| 6,405,132 B1 | 6/2002 | Breed et al. | 701/301 |
| 6,424,273 B1 * | 7/2002 | Gutta et al. | 340/937 |
| 6,438,491 B1 | 8/2002 | Farmer | 701/301 |
| 6,477,464 B2 * | 11/2002 | McCarthy et al. | 701/213 |
| 6,486,856 B1 | 11/2002 | Zink | 345/7 |
| 6,498,620 B2 | 12/2002 | Schofield et al. | 348/148 |
| 6,526,352 B1 | 2/2003 | Breed et al. | 701/213 |
| 6,587,778 B2 | 7/2003 | Stallard et al. | 701/117 |
| 6,650,998 B1 | 11/2003 | Rutledge et al. | 701/211 |
| 6,690,268 B2 * | 2/2004 | Schofield et al. | 340/438 |
| 6,757,109 B2 * | 6/2004 | Bos | 359/753 |
| 6,970,184 B2 * | 11/2005 | Hirama et al. | 348/148 |
| 6,980,092 B2 * | 12/2005 | Turnbull et al. | 340/425.5 |
| 7,005,974 B2 * | 2/2006 | McMahon et al. | 340/435 |
| 7,006,127 B2 * | 2/2006 | Mizusawa et al. | 348/118 |
| 7,072,764 B2 | 7/2006 | Donath et al. | 701/200 |
| 7,209,051 B2 | 4/2007 | Shankwitz et al. | 340/938 |
| 2001/0056326 A1 | 12/2001 | Kimura | 701/208 |
| 2002/0036584 A1 | 3/2002 | Jocoy et al. | 342/70 |
| 2002/0105438 A1 | 8/2002 | Forbes et al. | 340/901 |
| 2002/0184236 A1 | 12/2002 | Donath | 701/200 |
| 2003/0023614 A1 | 1/2003 | Newstrom | 707/104.1 |
| 2006/0095193 A1 | 5/2006 | Nishira et al. | 701/96 |

FOREIGN PATENT DOCUMENTS

| | | |
|---|---|---|
| EP | 1 096 229 A1 | 3/2000 |
| GB | 902590 | 8/1962 |
| WO | 99/51553 | 10/1999 |
| WO | WO 01/11388 A1 | 2/2001 |

OTHER PUBLICATIONS

Development of Driving Support System for Patrol Under Poor Visibility—Evaluation of First Pilot Model -, pp. 1-7, Nov. 19, 2003.

"See the Road Ahead," GPS—Augmented Reality Aids Drivers, Nov. 1, 2003, by: Stephen Scott-Young, GPS World (14 pages).

Office Communication dated Oct. 4, 2003 for U.S. Appl. No. 10/091,182, filed Mar. 5, 2002, for First Named Inventor Max Donath.

Office Communication for U.S. Appl. No. 09/618,613, filed Jul. 18, 2000, dated Dec. 12, 2003.

Office Communication from U.S. Appl. No. 09/618,613, filed Jul. 18, 2000. Date of Office Communication Feb. 6, 2004.

Preston, Howard; Storm, Richard; Donath, Max; and Shankwitz, Craig, Review of Minnesota's Rural Intersection Crashes: Methodology for Identifying Intersections for Intersection Decision Support (IDS), Mn/DOT Final Report MN/RC-2004-31, 2004.

Najm, W.J.; J.A. Koopmann and D.L. Smith. "Analysis of Crossing Path Crash Countermeasure Systems." Proceedings of the 17th International Technical Conference on the Enhanced Safety of Vehicles, Amsterdam, The Netherlands. Jun. 2001.

Chovan, J.D.; L. Tijerina; J.A. Pierowica; and D.L. Henricks. "Examination of Unsignalized Intersection Straight Crossing Path Crashes and Potential IVHS Countermeasures," Report DOT HS 808 152, DOT-VNTSC-NHTSA-94-2. Volpe National Transportation Systems Center, Washington, D.C., Aug. 1994.

Menon, Arvind; Gorjestani, Alec; Shankwitz, Craig; and Donath, Max. "Roadside Range Sensors for Intersection Decision Support," Proceedings of the 2004 IEEE ITS Conference (ITSC 2004), Washington, D.C., Oct. 2004.

Folding Puzzle Device, photographs attached which was publically available at least as early as Dec. 19, 2001.

"Technology of Fluoropolymers", George Drony, CRC Press, pp. 8-11, 8-19, 1991.

* cited by examiner

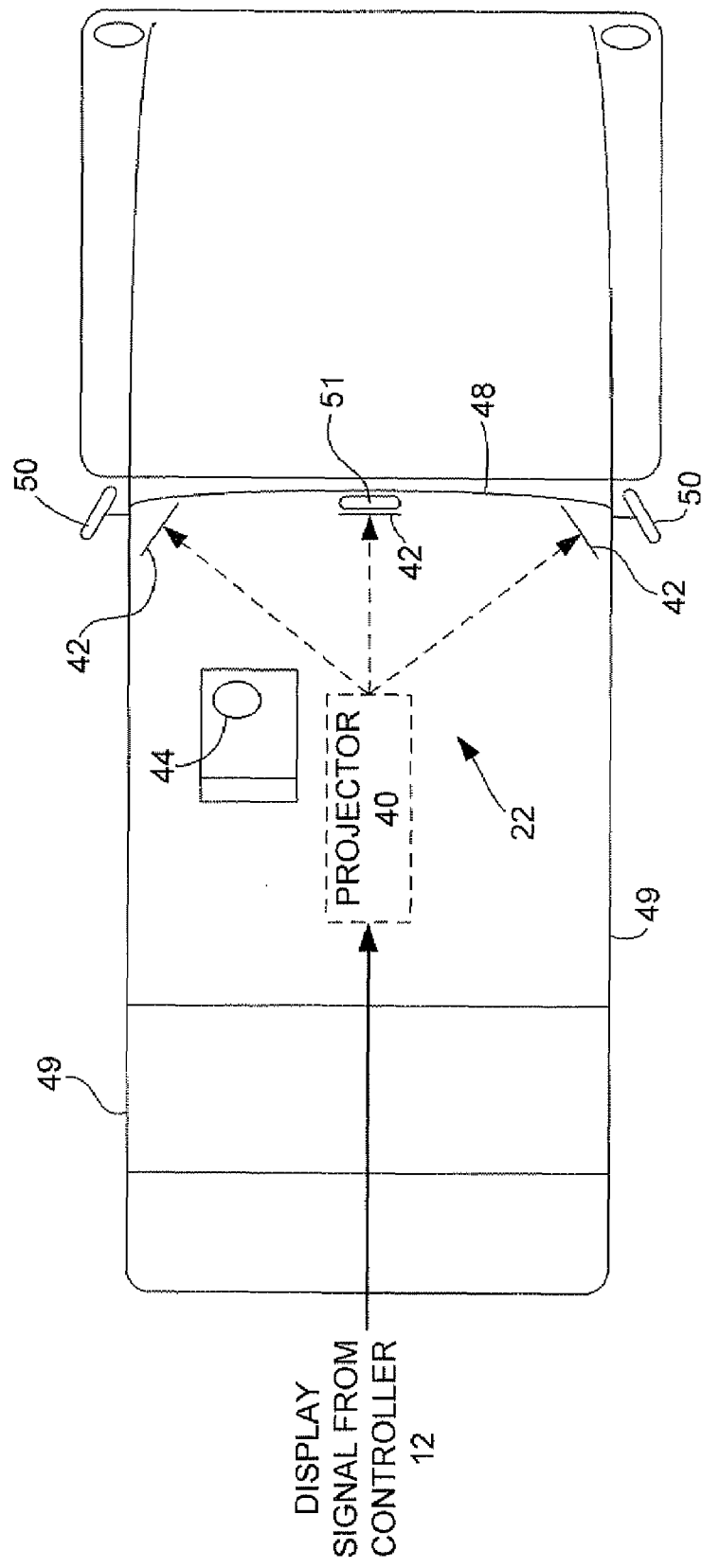

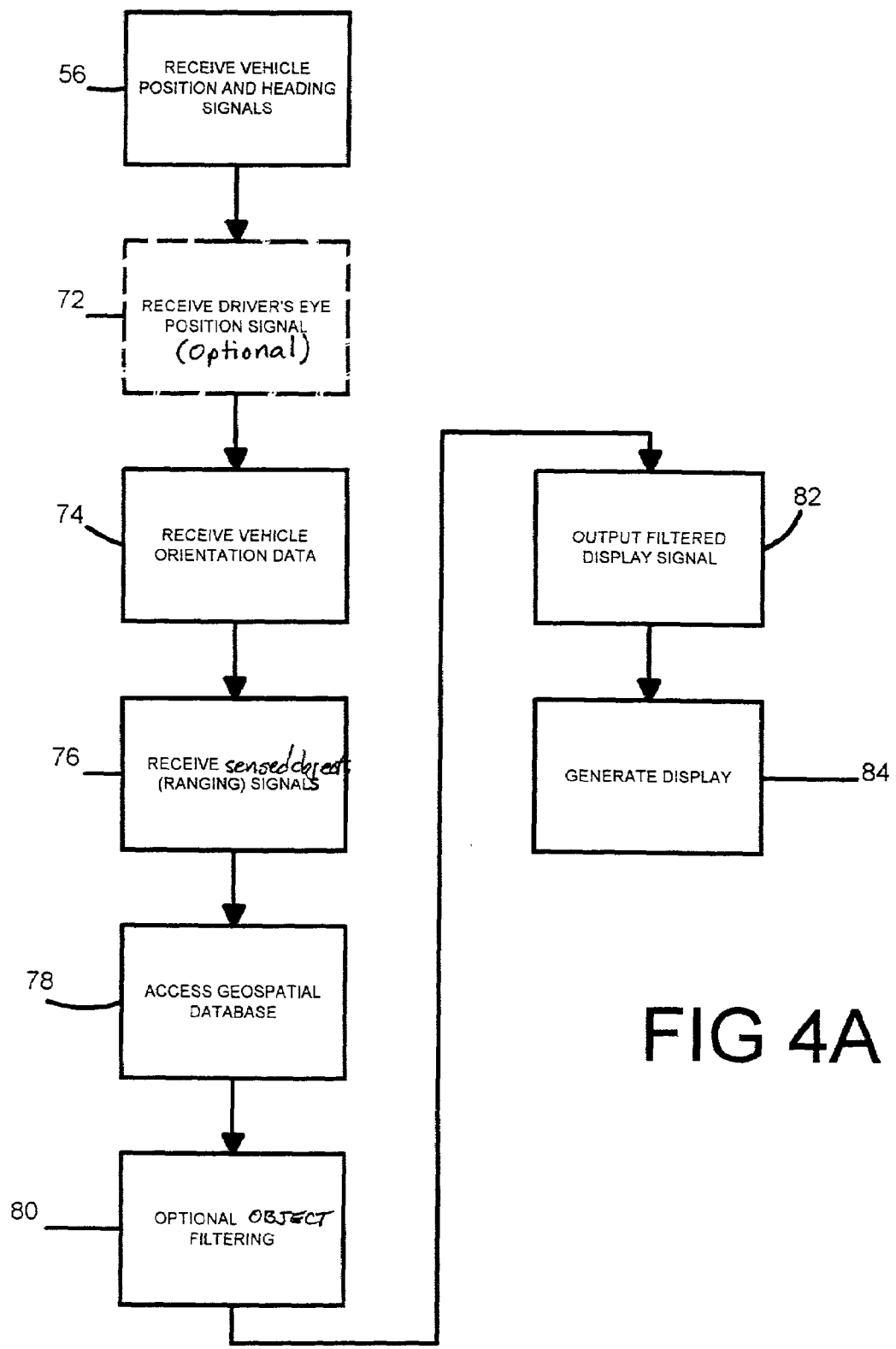

VIRTUAL MIRROR

The present invention hereby incorporates by reference and claims priority from co-pending U.S. patent application Ser. No. 09/618,613, filed Jul. 18, 2000.

BACKGROUND OF THE INVENTION

The present invention deals with mirrors. More particularly, the present invention deals with a vision enhancement device in the form of a computer generated virtual replica of a mirror.

Mirrors associated with motor vehicles assist the driver by providing spatial awareness of traffic conditions behind (and to the sides of) the drivers vantage point. Conventional mirrors have several disadvantages. A first of these disadvantages is the blind zones associated with a conventional mirror. Mirrors of conventional widths, on automobiles, provide a viewing angle from approximately 15 degrees to 30 degrees. Typically, drivers set the mirrors such that there is a great degree of overlap in these already narrow fields of view. Obstructions and limitations to the fields of view are due to the location and size of real mirrors. The problems associated with large blind spots, or blind zones, are aggravated for elderly people who may have less acute peripheral vision and/or may encounter difficulty in turning their head.

Another problem with conventional mirrors is that the view from the mirror to the rear or side of the vehicle is often obstructed. For example, a passenger's head or vehicle pillars may obstruct the rearward or sideward looking views from the driver or from the mirror. Similarly, on large vehicles, such as trucks and sport utility vehicles, the views from the mirrors can be obstructed by portions of the vehicle body itself.

Another disadvantage presented by conventional mirrors is vibration. While this disadvantage is not as pronounced on small passenger cars, it presents a great deal of difficulty on large, commercial vehicles. As such a vehicle encounters uneven road surfaces, induced torques are transmitted to the mirror mounting hardware which causes the mirror to vibrate. These vibrations can be at frequencies which significantly disrupt the ability of the driver to distinguish meaningful information from the mirror.

Also, because the shaky reflection from a vibrating mirror is caused by the changing mirror orientation mirror angle, a change of $\theta$ in mirror orientation creates a change of $2\theta$ in image position. Therefore, as the mirror oscillates back and forth, the image also oscillates back and forth with twice the magnitude of the mirror oscillation, leading to a blurred image.

Another disadvantage of conventional mirrors is that they must be quite large in order to provide a significant rearward or sideward looking view. However, any mirror mounted forward of the operator obstructs the forward view. Therefore, large conventional mirrors can undesirably obstruct the operator's forward looking view.

Another disadvantage arises from the fact that many commercial vehicles use convex mirrors, in addition to flat mirrors. The convex mirrors show a wider area than flat mirrors. However, objects reflected in convex mirrors appear smaller than when looking at the same objects in a flat mirror. Due to this effect, the object appears to be further away from the host vehicle than it actually is. This requires drivers to allow for distance overestimation when maneuvering the vehicle.

One prior art technique for addressing some of the deficiencies of conventional mirrors involves the use of periscopes. Such a periscope consists of the usual inside mirror coupled to an ensemble of mirrors located on the roof of the vehicle. These mirrors are presumed to have an unrestricted field of view. However, such periscopes have been found to be very large and bulky, and adversely increase the air resistance and drag of the vehicle.

Other prior art approaches to addressing the problems associated with conventional mirrors involve a TV camera, fitted with wide angle optics installed on the rear of the vehicle. This technique also required a monitor in the instrument panel of the vehicle to provide a wide, unobstructed image. Such a setup requires a one meter wide display to cover a space at a distance of 70 meters away from the camera, at a one-to-one magnification. This translates to approximately a 90 degree field of view. In addition, such a TV monitor hooked up to a rearward looking camera does not operate satisfactorily under poor visibility conditions. The display can also lead to confusion because of the likely absence of the right-left lateral inversion associated with a reflected image.

SUMMARY OF THE INVENTION

A virtual mirror is rendered by a computer graphics display. The display substantially replicates the optical properties of a physical mirror. The display is provided on a host vehicle.

BRIEF DESCRIPTION OF THE DRAWINGS

FIG. 3 is a plan view in partial block diagram form of a virtual mirror and vision assist system mounted on a host vehicle.

FIGS. 4A and 4B are flow diagrams which illustrate generation of a virtual mirror in accordance with one embodiment of the present invention.

DETAILED DESCRIPTION OF THE ILLUSTRATIVE EMBODIMENTS

Figure 1:
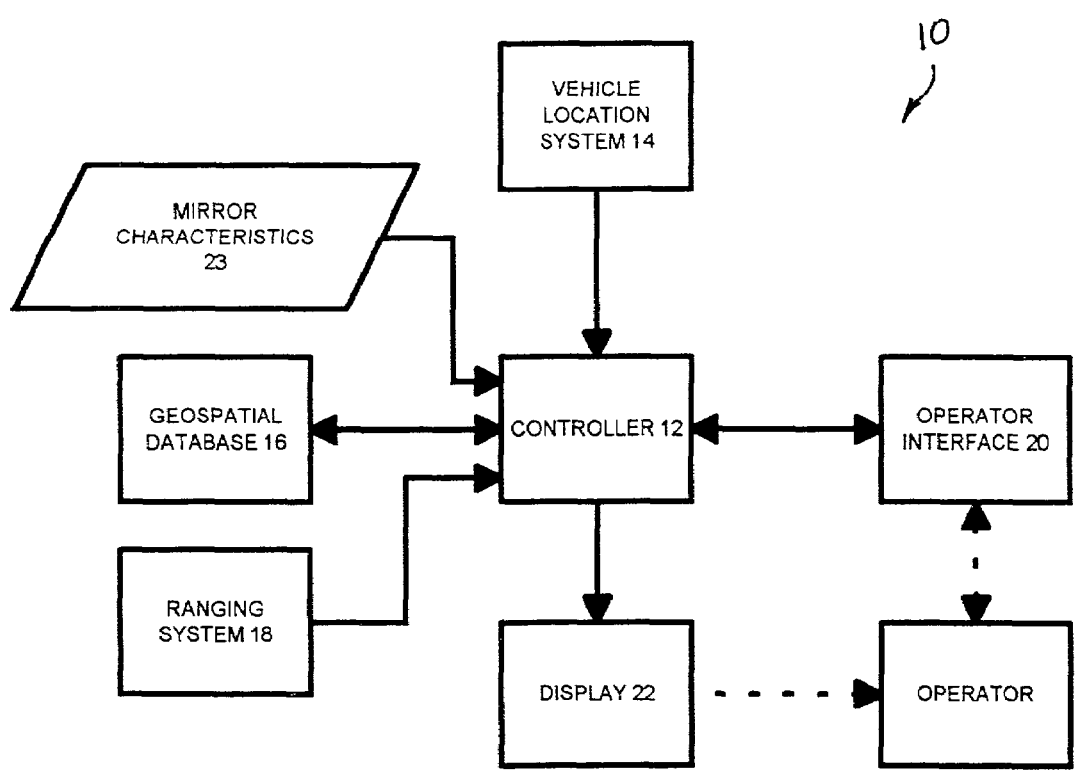
FIG. 1 is a block diagram of a vision assist system 10 in accordance with one embodiment of the present invention.

The present invention can be used with substantially any mobile body. However, the present description proceeds with respect to an illustrative embodiment in which the invention is implemented on a motor vehicle as a driver vision assist device (or virtual mirror). FIG. 1 is a simplified block diagram of one embodiment of vision assist device 10 in accordance with the present invention. Assist device 10 includes controller 12, vehicle location system 14, geospatial database 16, ranging system 18, operator interface 20 and display 22. FIG. 1 also shows that controller 12 receives, as an input, virtual mirror characteristics 23.

In one embodiment, controller 12 is a microprocessor, microcontroller, digital computer, or other similar control device having associated memory and timing circuitry. It should be understood that controller 12 can be implemented as one or more processors or computers, and that the memory can be integrated with controller 12, or be located separately therefrom. The memory, of course, may include random access memory, read only memory, magnetic or optical disc drives, tape memory, or any other suitable computer readable medium.

Operator interface 20 is illustratively a graphical user interface (GUI) keyboard, a touch-sensitive screen, a point and click user input device (e.g. a mouse), a keypad, a voice activated interface, joystick, physical input used to move the device (e.g., the virtual mirror instrumented to measure its position and orientation relative to the drive and vehicle), or any other type of user interface suitable for receiving user commands, and providing those commands to controller 12, as well as providing a user viewable indication of operating conditions from controller 12 to the user. The operator interface may also include, for example, the steering wheel and the throttle and brake pedals suitably instrumented to detect the operator's desired control inputs of heading angle and speed. Operator interface 20 may also include, for example, a LCD screen, LEDs, a plasma display, a CRT, audible noise generators as alarms or warning systems triggered by objects in the virtual mirror, or any other suitable operator interface display or speaker unit. These can include haptic, or vibratory tactile signals applied to the driver's hands through the steering wheel, the seat or throttle pedals and brake. The alarms or warnings are triggered when objects in the virtual mirror get dangerously close to the driver's vehicle and are set based on pre-programmed thresholds.

As is described in greater detail later in the specification, vehicle location system 14 determines and provides a vehicle location signal, indicative of the vehicle location in which assist device 10 is mounted, to controller 12. Thus, vehicle location system 14 can include a global positioning system receiver (GPS receiver) such as a differential GPS receiver, an earth reference position measuring system, a dead reckoning system (such as odometery and an electronic compass), an inertial measurement unit, IMU (such as accelerometers, inclinometers, or rate gyroscopes), etc. In any case, vehicle location system 14 periodically provides a location signal to controller 12 which indicates the location of the vehicle on the surface of the earth.

Geospatial database 16 contains a digital map which digitally locates road boundaries, lane boundaries, possibly some landmarks (such as road signs, water towers, or other landmarks) and any other desired items (such as road barriers, bridges etc . . . ) and describes a precise location and attributes of those items on the surface of the earth.

The digital map stored in the geospatial database 16 contains a series of numeric location data of, for example, the center line and lane boundaries of a road on which system 10 is to be used, as well as construction data which is given by a number of shape parameters including, starting and ending points of straight paths, the center of circular sections, and starting and ending angles of circular sections. While the present system is described herein in terms of starting and ending points of circular sections it could be described in terms of starting and ending points and any curvature between those points. For example, a straight path can be characterized as a section of zero curvature. Each of these items is indicated by a parameter marker, which indicates the type of parameter it is, and has associated location data giving the precise geographic location of that point on the map.

In one embodiment, each road point of the digital map in database 16 was generated at uniform 10 meter intervals. In one embodiment, the road points represent only the centerline of the road, and the lane boundaries are calculated from that centerline point. In another embodiment, both the center line and lane boundaries are mapped. Of course, geospatial database 16 also illustratively contains the exact location data indicative of the exact geographical location of street signs and other desirable landmarks. Database 16 can be obtained by manual mapping operations or by a number of automated methods such as, for example, placing a GPS receiver on the lane stripe paint spraying nozzle or tape laying mandrel to continuously obtain locations of lane boundaries.

It should be noted that there are many possible coordinate systems that can be used to express a location on the surface of the earth, but the most common coordinate frames include the longitudinal and latitudinal angles, the state coordinate system, and the county coordinate system.

Because the earth is approximately spherical in shape, it is convenient to determine a location on the surface of the earth if the location values are expressed in terms of an angle from a reference point. Longitude and latitude are the most commonly used angles to express a location on the earth's surface or in orbits around the earth. Latitude is a measurement on a globe of location north or south of the equator, and longitude is a measurement of the location east or west of the prime meridian at Greenwich, the specifically designated imaginary north-south line that passes through both geographic poles of the earth and Greenwich, England. The combinations of meridians of longitude and parallels of latitude establishes a framework or grid by means of which exact positions can be determined in reference to the prime meridian and the equator. Many of the currently available GPS systems provide latitude and longitude values as location data.

Even though the actual landscape on the earth is a curved surface, it is recognized that land is utilized as if it is a flat surface. A Cartesian coordinate system whose axes are defined as three perpendicular vectors is usually used. Each state has its own standard coordinate system to locate points within their state boundaries. All construction and measurements are done using distance dimensions (such as meters or feet). Therefore, a curved surface on the earth needs to be converted into a flat surface and this conversion is referred to as a projection. There are many projection methods used as standards for various local areas on the earth's surface. Every projection involves some degree of distortion due to the fact that a surface of a sphere is constrained to be mapped onto a plane. One standard projection method is the Lambert Conformal Conic Projection Method. This projection method is extensively used in an ellipsoidal form for large scale mapping of regions of predominantly east-west extent, including topographic, quadrangles for many of the U.S. state plane coordinate system zones, maps in the International Map of the World series and the U.S. State Base maps. The method uses well known, and publicly available, conversion equations to calculate state coordinate values from GPS receiver longitude and latitude angle data.

Ranging system 18 is configured to detect sensed objects in the vicinity of the vehicle in which system 10 is implemented (i.e., the host vehicle), and also to detect a location (such as range, range rate and azimuth angle) of the detected objects, relative to the vehicle. Sensed objects are illustratively objects which must be monitored because they may collide with the mobile body either due to motion of the body or of the object. In one illustrative embodiment, ranging system 18 is a radar system such as the one that is commercially available from Eaton Vorad. However, ranging system 18 can also include a passive or active infrared system (which could also provide the amount of heat emitted from the detected objects) or laser based ranging system, or a directional ultrasonic system, or other similar systems. Another embodiment of system 18 is an infrared sensor calibrated to obtain a scaling factor for range, range rate and azimuth which is used for transformation to an eye coordinate system. Such a system can be used to provide the lateral or cross sectional shape of the object that is being ranged.

Inter-vehicle communication can also be used to detect other vehicles and the positions of those vehicles. Vehicle location, speed, size, weight and shape can be communicated to all other vehicles. Vehicle characteristics are encoded in the vehicle identification number (VIN) of each vehicle while vehicle dynamics and braking characteristics can be determined or inferred from the VIN as well, so communicating the VIN from vehicle-to-vehicle is one way of communicating this information. This can be done using a suitable wireless communication device.

Display 22 can, in one embodiment, be a flat panel display that receives a signal from controller 12 and displays a mirror view. Display 22 can also be another type of display that gives depth of viewing, such as one mounted in eye glasses or any other such type of display. The display 22 can be mounted in conventional mirror locations such as those shown in FIG. 3 or in other locations.

Alternatively, display 22 can include a projection unit and one or more combiners which are described in greater detail later in the specification. Briefly, the projection unit receives a video signal from controller 12 and projects video images onto one or more combiners. The projection unit illustratively includes a liquid crystal display (LCD) matrix (such as a computer screen) and a high-intensity light source similar to a conventional video projector, except that it is small so that it fits near the driver's seat space. The combiner is a partially-reflective, partially transmissive beam combiner formed of optical glass or polymer for reflecting the projected light from the projection unit back to the driver. In one embodiment, the combiner is positioned such that the driver looks through the combiner, when looking at a rear view or side view mirror, so that the driver can see both the actual reflection in the mirror, as well as the computer generated images projected onto the combiner. In one illustrative embodiment, the computer-generated images substantially overlay the actual images.

It should also be noted, however, that combiners or other similar devices or flat screen displays can be placed about the driver to cover fields of view directed to both rear view and side view mirrors. This can illustratively be implemented using a plurality of projectors or a single projector with appropriate optics to scan the projected image across the appropriate fields of view. It can also be accomplished by simply providing the controller signal to multiple flat screen or flat panel displays.

Figure 2:
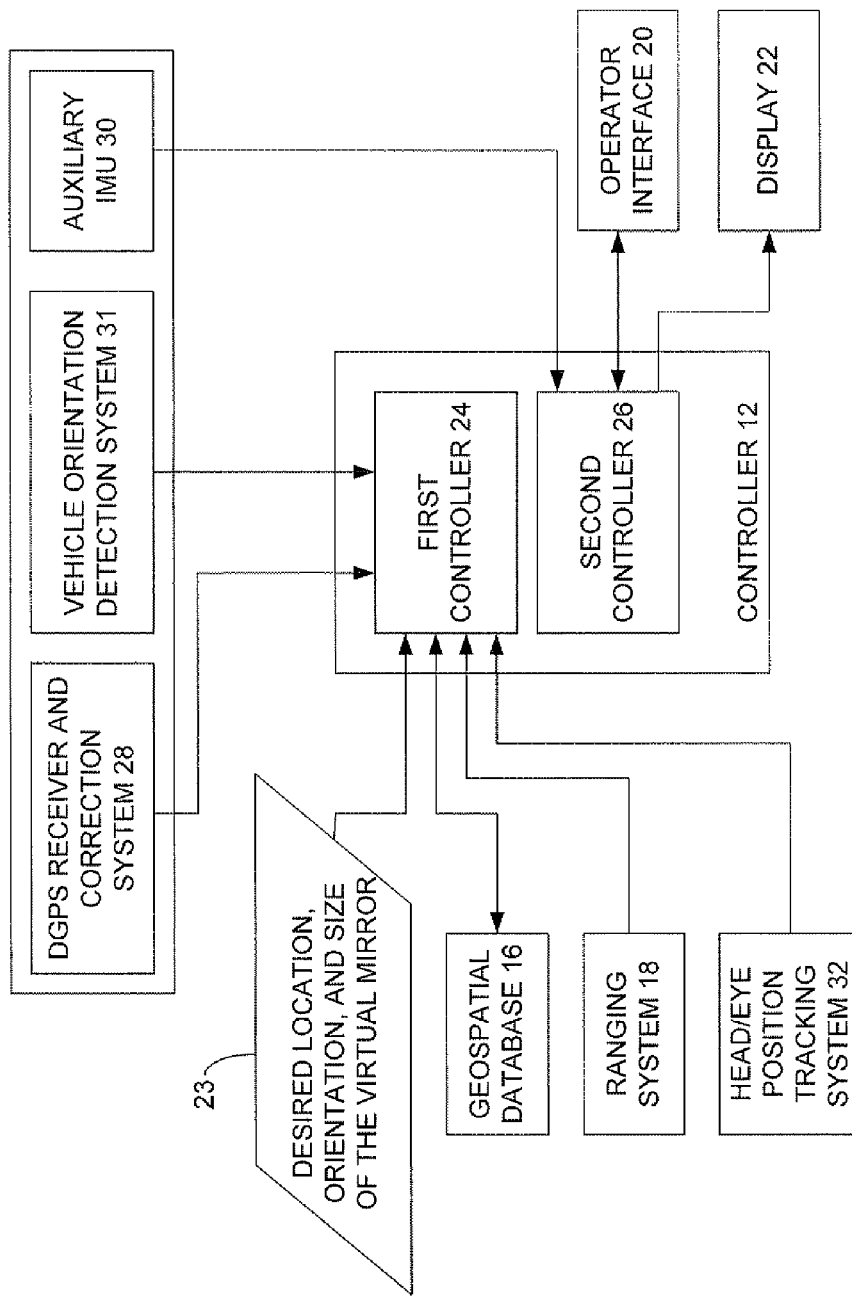
FIG. 2 is a more detailed block diagram of another embodiment of the vision assist system.

Before discussing the operation of system 10 in greater detail, it is worth pointing out that system 10 can also, in one illustrative embodiment, be varied, as desired. For example, FIG. 2 illustrates that controller 12 may actually be formed of first controller 24 and second controller 26 (or any number of controllers with processing distributed among them, as desired). In that embodiment, first controller 24 performs the primary data processing functions with respect to sensory data acquisition, and also performs database queries in the geospatial database 16. This entails obtaining velocity and heading information from the GPS receiver and correction system 28. First controller 24 also performs processing of the signal from radar ranging system 18.

FIG. 2 also illustrates that vehicle location system 14 may illustratively include a differential GPS receiver and correction system 28 as well as an auxiliary inertial measurement unit (IMU) 30 (although other approaches would also work). Second controller 26 processes signals from auxiliary IMU 30, where necessary, and handles graphics computations for providing the appropriate video signal to display 22.

In a specific illustrative embodiment, differential GPS receiver and correcting system 28 is illustratively a Novatel RT-20 differential GPS (DGPS) system with a 20-centimeter accuracy, while operating at a 5 Hz sampling rate or Trimble MS 750 with 2 cm accuracy operating at 10 Hz sampling rate. FIG. 2 also illustrates that system 10 can include optional vehicle orientation detection system 31 and driver's eye position system 32. Some of the illustrations depicted herein were generated using a camera which acts to simulate the driver's eye. Therefore, the camera is used interchangeably with the driver's eye (e.g., camera position is used interchangeably with eye position, etc.). Vehicle orientation detection system 31 detects the orientation (such as roll and pitch) of the host vehicle. The roll angle refers to the rotational orientation of the vehicle about its longitudinal axis (which is parallel to its direction of travel). The roll angle can change, for example, if the vehicle is driving over a banked road, or on uneven terrain. The pitch angle is the angle that the vehicle makes in a vertical plane along the longitudinal direction. The pitch angle becomes significant if the vehicle is climbing up or descending down a hill. Taking into account the pitch and roll angles can make the projected image more accurate, and more closely conform to the actual image seen by the driver.

Optional driver's eye (or camera) position tracking system 32 can be provided to accommodate for movements in the driver's head or eye position relative to the vehicle. Of course, in one illustrative embodiment, the actual head and eye position of the driver is not monitored. Instead, the dimensions of the cab or operator compartment of the host vehicle are taken and used, along with ergonomic data, such as the height and eye position of an operator, given the dimension of the operator compartment, and the image is projected on display 22 such that the displayed images will substantially overlie the actual mirrored images for an average operator. Specific measurements can be taken for any given operator as well, such that such a system can more closely conform to any given operator.

Alternatively, optional driver's eye position tracking system 32 is provided. System 32 tracks the position of the operator's head, and eyes, (or camera) in real time.

FIG. 3 illustrates that display 22 includes projector 40, and one or more combiners 42. FIG. 3 also illustrates an operator's head position 44 with an operator sitting in an operator compartment that includes seat 46 and that is partially defined by windshield 48 and side window 49.

Projector 40 receives the video display signal from controller 12 and projects road data onto one or more of the combiners 42 or controller 12 simply renders it on a flat panel display (in which case the combiner need not be used). In an embodiment where the image is combined with an image in an actual mirror, combiners 42 are partially reflective and partially transmissive. Therefore, the operator looks forward or sideways through combiners 42 to a virtual focal plane that coincides with the location of side view mirrors 50 or rear view mirror 51. The road data (such as lane boundaries) are projected from projector 40 in proper perspective onto combiners 42 such that the lane boundaries appear to substantially overlie those which the operator actually sees in the mirror (or would see if the mirrors had unobstructed view), in the correct perspective. Of course, additional coverage can also be provided to subsequently eliminate mirror blind spots. In this way, when the operator's view of the actual lane boundaries through the mirror becomes obstructed, the operator can still determine what an unobstructed mirror view would look like.

It should be noted that combiners 42, in one illustrative embodiment, are hinged to an upper surface or side surface or other structural part, of the operator compartment. Therefore, combiners 42 can be pivoted up and out of the view of the operator and down again when the operator desires to look through combiners 42.

Each combiner 42, while being partially reflective, is essentially a transparent, optically correct, coated glass or polymer lens. Light reaching the eyes of operator 44 is a combination of light passing through the lens (such as light from the mirror) and light reflected off of the lens from the projector. With an unobstructed mirror view, the driver actually sees two images accurately superimposed together. The image passing through the combiner 42 comes from the reflection from the mirror, while the reflected image is generated by the graphics processor portion of controller 12. The optical characteristics of combiner 42 allow the combination of elements to generate the virtual screen, or virtual focal plane. This feature results in a virtual focus on the mirror which may be outside the vehicle and ensures that the driver's eyes are not required to focus back and forth between the real image and the virtual image, thus reducing eyestrain and fatigue. Of course, where display 22 is a flat panel display, the virtual mirror display is simply rendered on the flat panel display. Flat panel displays such as those from Dimensional Technologies, of Rochester, N.Y. can be used as well as others.

Another embodiment is a helmet supported visor (or eyeglass device) on which images are projected, through which the driver can still see. Such displays might include technologies such as those available from Kaiser Electro-Optics, Inc. of Carlsbad, Calif., The MicroOptical Corporation of Westwood, Mass., Universal Display Corporation of Ewing, N.J., Microvision, Inc. of Bothell, Wash., IODisplay System LLC of Menlo Park, Calif.

FIG. 4A is a simplified flow diagram illustrating the operation of system 10. Controller 12 first receives vehicle location data in the form of heading and position. Of course, this data is received from vehicle location system 14 and is indicated by block 56 in FIG. 4A.

The heading angle of the vehicle can be estimated from the past history of the GPS location data. Alternatively, a rate gyroscope can be used to determine vehicle heading as well. As noted initially, though heading angle estimation by successive differentiation of GPS data can be used, any other suitable method to measure an absolute heading angle can be used as well, such as a magnetometer (electronic compass) or an inertial measurement unit.

Once controller 12 has received the vehicle location data, controller 12 also optionally receives head or eye location information, as well as optional vehicle orientation data. As briefly discussed above, the vehicle orientation information can be obtained from a roll rate gyroscope to obtain the roll angle, and a tilt sensor (such as an accelerometer) to obtain the pitch angle as well as a yaw rate sensor to obtain yaw angle. Obtaining the head or eye (or camera) location data and the vehicle orientation data are illustrated by optional blocks 72 and 74 in FIG. 4A.

A number of transformation matrices are constructed, as described in greater detail below, from the location and heading angle of the moving vehicle, and from the optional driver's head or eye data and vehicle orientation data, where that data is sensed. The location data is converted into a local coordinate measurement using the transformation matrices, and is then fed into the perspective projection routines to calculate and draw the road shape and sensed object icons in the computer's graphic memory. The road shape and sensed object icons are then projected as a virtual view in the driver's visual field, as illustrated in FIG. 3 above.

In any case, after the vehicle position data is received, the ranging information from ranging system 18 is also received by controller 12 (shown in FIG. 2). This is indicated by block 76 in FIG. 4A. The ranging data illustratively indicates the presence and location of sensed objects around the vehicle. For example, the radar ranging system 18 developed and available from Eaton Vorad, or Delphi, or Celsius Tech, or other vendors provides a signal indicative of the presence of a radar sensed object, its range, its range rate and the azimuth angle of that sensed object with respect to the radar apparatus.

Based on the position signal, controller 12 queries the digital road map in geospatial database 16 and extracts local road data. The local road data provides information with respect to road boundaries as seen by the operator at the position of the vehicle, and also other potential radar sensed objects, such as road signs, bridge abutments, or underpasses, guard rails, road barriers, landmarks such as water towers, etc. Accessing geospatial database 16 (which can be stored on the vehicle and receive periodic updates or can be stored remotely and accessed wirelessly) is indicated by block 78 in FIG. 4A.

Controller 12 determines whether the sensed objects indicated by sensed object data 83 are expected sensed objects. Controller 12 does this by examining the information in geospatial database 16. In other words, if the sensed objects correspond to road signs, road barriers, bridges, or other information which would provide a radar return to ranging system 18, but which is expected because it is mapped into database 16 and does not need to be brought to the attention of the driver, that information can optionally be filtered out such that the driver is not alerted to every single possible item on the road which would provide a radar return. Certain objects may a priori be programmed to be brought to the attention of the driver. Such items may be guard rails, bridge abutments, etc . . . and the filtering can be selective, as desired. If, for example, the driver were to exit the roadway, all filtering can be turned off so all objects are brought to the driver's attention. The driver can change filtering based on substantially any predetermined filtering criteria, such as distance from the road or driver, location relative to the road or the driver, whether the objects are moving or stationary, or substantially any other criteria. Such criteria can be invoked by the user through the user interface, or they can be pre-programmed into controller 12.

However, where the geospatial database does not indicate an expected sensed object in the present location, then the sensed object information is determined to correspond to an unexpected sensed object, such as a moving vehicle behind or to the side of the host vehicle, such as a stalled car or a pedestrian on the side of the road, or such as some other transitory sensed object that has not been mapped to the geospatial database as a permanent, or expected. It has been found that if all expected sensed objects are brought to the operator's attention, this substantially amounts to noise so that when real sensed objects are brought to the operator's attention, they are not as readily perceived by the operator. Therefore, optional filtering of sensed objects not posing a threat to the driver can be performed as is illustrated by block 80 in FIG. 4A.

Once such sensed objects have been filtered, the transformation is performed using the transformation matrices. The result of the transformation provides the road boundary data, as well as the sensed object data, seen from the driver's eye perspective through the mirror. The road boundary and sensed object data is output, as illustrated by block 82 in FIG. 4A. Based on the output road and sensed object data, the road and sensed object shapes are generated by processor 12 for projection in the proper perspective. Generation of road and sensed object shapes and the perspective projection is illustrated by block 84 in FIG. 4A.

It should also be noted that the actual image projected is clipped such that it only includes that part of the road which would be visible by the operator with an unobstructed mirror view. Clipping is described in greater detail below.

Figure 4B:
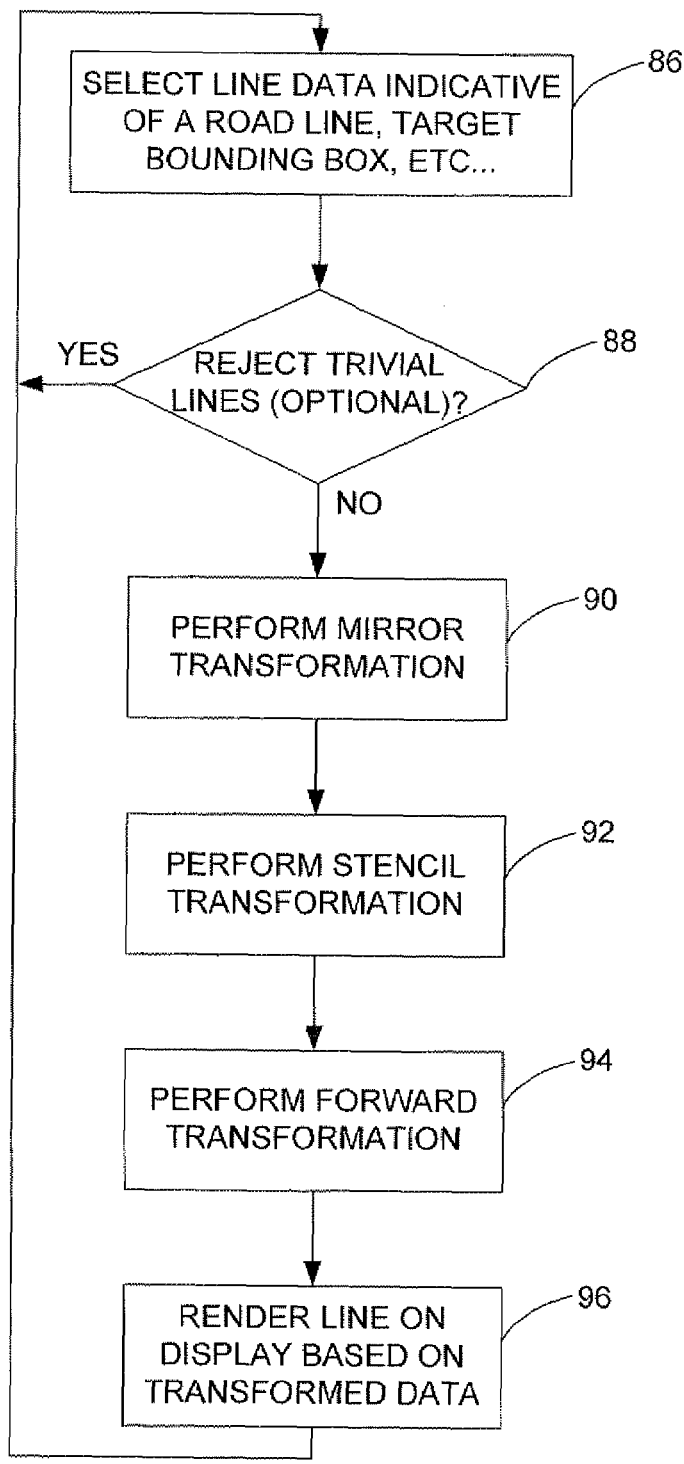

FIG. 4B is a more detailed flow diagram illustrating how the display of the virtual mirror is generated (as indicated by block 84 in FIG. 4A). In one illustrative embodiment, the information contained in the geospatial database 16 represents lane boundaries, guard rails, shoulders, traffic islands, traffic signs, and other such road "furniture" as a linked list of lines. The vehicle wire frames associated with the host vehicle as well as sensed object vehicles, are bounded by boxes that are also stored as a linked list of lines.

In order to generate the virtual mirror display, controller 12 first selects line data indicative of a road line, a sensed object bounding box, etc. This is indicated by block 86 in FIG. 4B. Next, controller 12 optionally determines whether the line data should be trivially rejected. That is, the scene displayed by the virtual mirror includes a plurality of lines. Each line must be transformed, clipped and then projected to form the virtual mirror display. The transformation, as is discussed in greater detail below, involves multiplying end points of the lines by a transformation matrix. The line is clipped against six faces of a perspective canonical volume and is projected by multiplying the end points of the projection matrix followed by homogeneous division. It can thus be seen that the computations necessary to display a line can be quite time consuming to perform. Therefore, if the line which has been selected at block 86 lies far away from the host vehicle, so that it is too far away to substantially affect the final rendered view, then the line can be rejected before the extensive computations are undertaken. Optional trivial rejection of the line is indicated by block 88 in FIG. 4B.

If the line is trivially rejected, then processing returns to block 86 where new line data is selected. However, if the line is not trivially rejected, controller 12 first performs a mirror transformation on the line data as indicated by block 90. The mirror transformation adapts the mirror optics to a conventional forward transformation. In other words, the mirror transformation performs the basic reflection transformation that transforms a vertex given in world coordinates to its reflected image. The mirror transformation also includes normalization, clipping and projection which are described in greater detail below.

The lines which will be visible on the mirror display after the mirror transformation is performed are output and controller 12 next performs a stencil transformation as indicated by block 92. The stencil transformation is a two-dimensional (2D) space to 2D space transformation. It transforms the 2D projected view of the mirror transformation to the 2D desired shape of the generated virtual mirror.

Once the stencil transformation is performed, the points in the virtual mirror display can be treated like ordinary points in the forward field of view. That is, they can undergo the entire sequence of forward transformation and be mapped for viewing. The forward transformation enables perspective projection so that a three-dimensional world can be represented on a two-dimensional space, while retaining the feeling of "depth" in the scene. Thus, parallel lines seem to meet at a point called the vanishing point. Objects appear larger if they are closer to the point of view than if they are further away. This is referred to herein as "perspective foreshortening". Performance of the forward transformation is indicated by block 94 in FIG. 4B.

After the forward transformation has been performed, the line is rendered on the virtual mirror display based on the transformed data. Rendering the line is illustrated by block 96 in FIG. 4B.

Blocks 88-96 in FIG. 4B will now be discussed in greater detail. The forward transformation indicated by block 94 is the final stage in the algorithmic sequence, but forms a basic stage in the development of mathematical treatment of the virtual mirror display. Therefore, the forward transformation will be discussed first. Rendering and displaying is discussed in conjunction with the forward transformation. The next logical stage in mathematical development of the present invention is the mirror transformation illustrated in block 90 of FIG. 4B. The mirror transformation is thus discussed next. The third stage in the mathematical development of the virtual mirror is the stencil transformation which bounds the mirror and forward transformations. This will thus be discussed after the mirror transformation. Finally, the optional trivial rejection illustrated by block 88 is discussed in greater detail.

Forward Transformation

As briefly discussed above, the aim of the forward transformation is to achieve perspective projection so that the 3D world can be projected on to a 2D space. The procedure to accomplish this involves projecting all vertices in the world coordinate system onto an infinite 2D plane referred to as the projection plane by straight lines referred to as projectors. For perspective projection, all projectors meet at a single point referred to as the projection reference point (PRP). The view reference coordinate (VRC) system is an arbitrary coordinate system defined so that the projection plane becomes the XY plane of the view reference coordinate system, and the projection reference point (PRP) is a positive Z coordinate in this coordinate system. The view reference coordinate system is given by the homogeneous transformation matrix $X_{vrc}$ relative to the world coordinate system.

The term window is a rectangular area on the projection plane. The projection plane and the window lie in the Z=0 plane of the view reference coordinate system. The window is not to be confused with desktop windows or computer screen windows launched by window managers. The window limits the view seen from the camera position (PRP). The edges of the window are parallel to the X and Y axes of the view reference coordinate system. Therefore, it is possible to define a window by the minimum and maximum limits of the X and Y coordinates of the VRC:

WINDOW=[WNDLEFT WNDRIGHT WINDBOTTOM WNDTOP],      Eq. 1 where the WINDOW is represented by a four element vector,

WNDLEFT=the minimum x limit;
WNDRIGHT=the maximum x limit;
WNDBOTTOM=the minimum y limit; and
WNDTOP=the maximum y limit.

Figure 5:
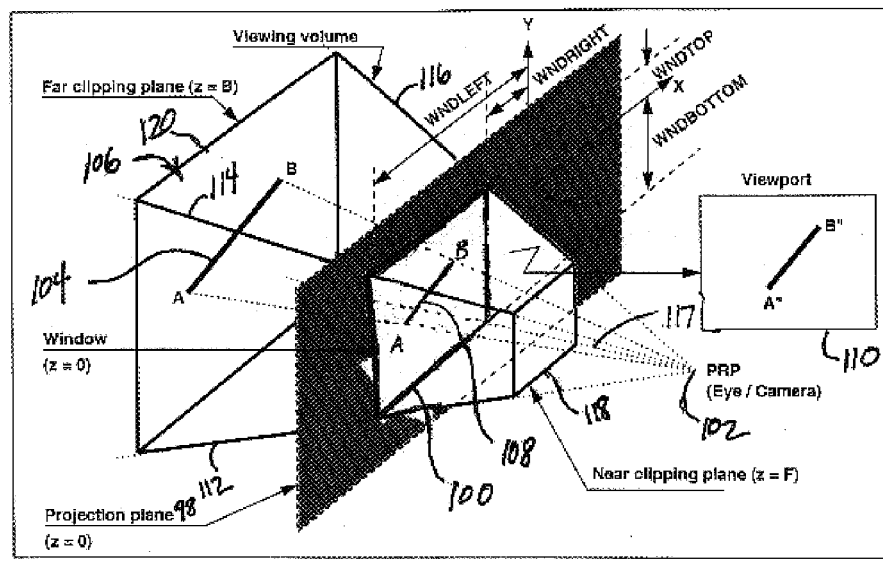
FIG. 5 is an illustration of a viewing volume in accordance with one embodiment of the present invention.

FIG. 5 better illustrates a number of the terms defined above. The infinite plane 98 corresponds to the projection plane. Area 100 represents the window through which the operator is viewing. Element 102 corresponds to the PRP. Therefore, all lines, such as line 104 (having end points A and B) lying inside a viewing volume 106 are projected by means of straight lines 108 (the projectors) on the two-dimensional projection plane 98. All of the projectors meet at the PRP 102. The field of view visible from the PRP is referred to as the viewing volume 106. The cross section of the viewing volume 106 and projection plane 98 is referred to as window 100. The mathematical transformations discussed below map the projected contents of window 100 onto a two-dimensional rectangular region referred to as viewport 110. FIG. 5 also illustrates the elements of Equation 1 above.

Four projectors 112, 114, 116 and 117 are drawn from the PRP 102 passing through four corners of the window 100 to form an infinitely high four sided pyramid. The pyramid is truncated by two planes parallel to the projection plane 98, one near the apex and one near the base, to form a frustrum. The top plane of the frustrum is referred to as the near clipping plane 118 and the base plane of the frustrum is referred to as the far clipping plane 120. This frustrum defines the viewing volume 106.

By the very manner in which the frustrum was generated, it is evident that the window 100 forms a cross section of the viewing volume 106. The near clipping plane 118 is parallel to the window 100 and given by the equation z=F and the far clipping plane 120 is also parallel to the window 100 and given by the equation z=B. In the discussions below, the near clipping plane 118 has been chosen to be located at z=0, so that the near clipping plane 118 coincides with window 100.

The viewport 110 is a rectangular area on a computer screen (such as an LCD matrix) onto which the final scene is rendered. The vertices projected onto the window 100 are ultimately mapped into the viewport 110. The viewport 110 is VIEWPORT_W pixels wide and VIEWPORT_H pixels high. This means that viewport coordinates are integers that range from 0 to VIEWPORT_W−1 in the X direction and 0 to VIEWPORT_H−1 in the Y direction. Unless specified otherwise, illustratively, VIEWPORT_W=640 and VIEWPORT_H=400.

All coordinate systems are defined in terms of 4×4 homogenous transformation matrices. The first, second and third columns are unit vectors that give the directions of the X, Y and Z axes of the coordinate system with respect to the axes of the World Coordinate System. The fourth column gives the position of the origin of the coordinate system with respect to the World Coordinate System. The fourth row of the homogeneous transformation matrices is always [0 0 0 1].

The notation used here to denote transformation matrices and their inverses is described as follows:

Homogeneous transformation matrices are 4×4 matrices that describe 3 dimensional rotation, translation and scaling. These matrices transform one coordinate system to another coordinate system as follows:

Translation to point {x, y, z}; x, y and z in meters:

$$Trans(x, y, z) = \begin{bmatrix} 1 & 0 & 0 & x \\ 0 & 1 & 0 & y \\ 0 & 0 & 1 & z \\ 0 & 0 & 0 & 1 \end{bmatrix} \quad \text{Eq. 2}$$

Rotation about the X axis through an angle of $\phi$ radians:

$$Rotx(\phi) = \begin{bmatrix} 1 & 0 & 0 & 0 \\ 0 & \cos(\phi) & -\sin(\phi) & 0 \\ 0 & \sin(\phi) & \cos(\phi) & 0 \\ 0 & 0 & 0 & 1 \end{bmatrix} \quad \text{Eq. 3}$$

Rotation about the Y axis through an angle of $\phi$ radians:

$$Roty(\phi) = \begin{bmatrix} \cos(\phi) & 0 & \sin(\phi) & 0 \\ 0 & 1 & 0 & 0 \\ -\sin(\phi) & 0 & \cos(\phi) & 0 \\ 0 & 0 & 0 & 1 \end{bmatrix} \quad \text{Eq. 4}$$

Rotation about the Z axis through an angle of $\phi$ radians:

$$Rotz(\phi) = \begin{bmatrix} \cos(\phi) & -\sin(\phi) & 0 & 0 \\ \sin(\phi) & \cos(\phi) & 0 & 0 \\ 0 & 0 & 1 & 0 \\ 0 & 0 & 0 & 1 \end{bmatrix} \quad \text{Eq. 5}$$

Scaling about the X, Y and Z axes by a factor a, b and c respectively:

$$Scale(a, b, c) = \begin{bmatrix} a & 0 & 0 & 0 \\ 0 & b & 0 & 0 \\ 0 & 0 & c & 0 \\ 0 & 0 & 0 & 1 \end{bmatrix} \qquad \text{Eq. 6}$$

Any number of translation, rotation and scaling matrices can be multiplied together to form a composite or aggregate matrix. The fourth row is always [0 0 0 1] for the composite matrix.

Given that a homogeneous transformation matrix transforms coordinate system A to coordinate system B, the matrix inverse transforms coordinate system B to coordinate system A.

Inverse of translation matrix:

$$\text{Trans}^{-1}(x, y, z) = \text{Trans}(-x, -y, -z) \qquad \text{Eq. 7}$$

Pure rotational matrices are orthonormal, and hence their inverses are just their transposes.

$$\text{Rot}z^{-1}(\phi) = \text{Rot}z(-\phi) = \text{Rot}z^T(\phi) \qquad \text{Eq. 8}$$

Since the scaling matrix is a diagonal matrix, its inverse is a diagonal matrix with the elements of the diagonal being reciprocals of the elements in the original matrix.

$$Scale^{-1}(a, b, c) = Scale\left(\frac{1}{a}, \frac{1}{b}, \frac{1}{c}\right) \qquad \text{Eq. 9}$$

Composite matrices formed by multiplying any number of translating, rotational and scaling matrices have a simple inverse.

$$M = \begin{bmatrix} x1 & y1 & z1 & px \\ x2 & y2 & z2 & py \\ x3 & y3 & z3 & pz \\ 0 & 0 & 0 & 1 \end{bmatrix} \qquad \text{Eq. 10}$$

$$M^{-1} = \begin{bmatrix} x1 & x2 & x3 & -px \cdot x1 - py \cdot x2 - pz \cdot x3 \\ y1 & y2 & y3 & -px \cdot y1 - py \cdot y2 - pz \cdot y3 \\ z1 & z2 & z3 & -px \cdot z1 - py \cdot z2 - pz \cdot z3 \\ 0 & 0 & 0 & 1 \end{bmatrix} \qquad \text{Eq. 11}$$

The 3×3 principal sub-matrix of the inverse is the transpose of the 3×3 principal sub-matrix of the original matrix. The first three elements of the fourth column of the inverse are the negatives of the dot products of the fourth column of the original matrix with the first three columns of the original matrix. This avoids the necessity to use generic but computationally expensive methods for computing the matrix inverse like the known Gauss-Jordan elimination.

For purposes of this discussion, the World Coordinate System (WCS) is a fixed reference coordinate system with respect to which all other coordinate systems are defined. The host coordinate system is given by the homogeneous transformation matrix $X_{GPS}$ with respect to the World Coordinate System.

Figure 6:
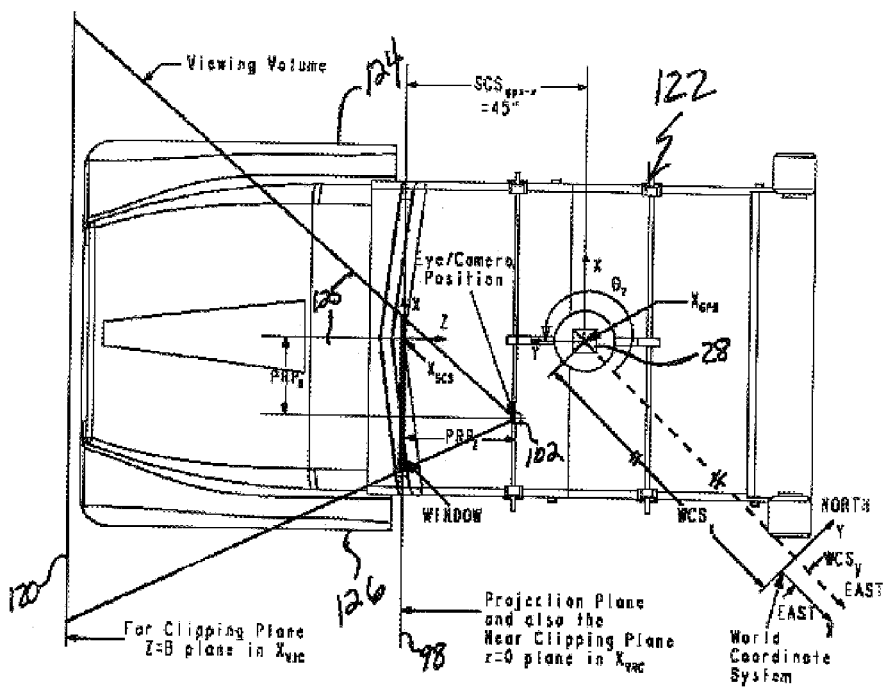
FIG. 6 is a plan view of a host vehicle indicating the placement of a number of elements of the present invention.
Figure 7:
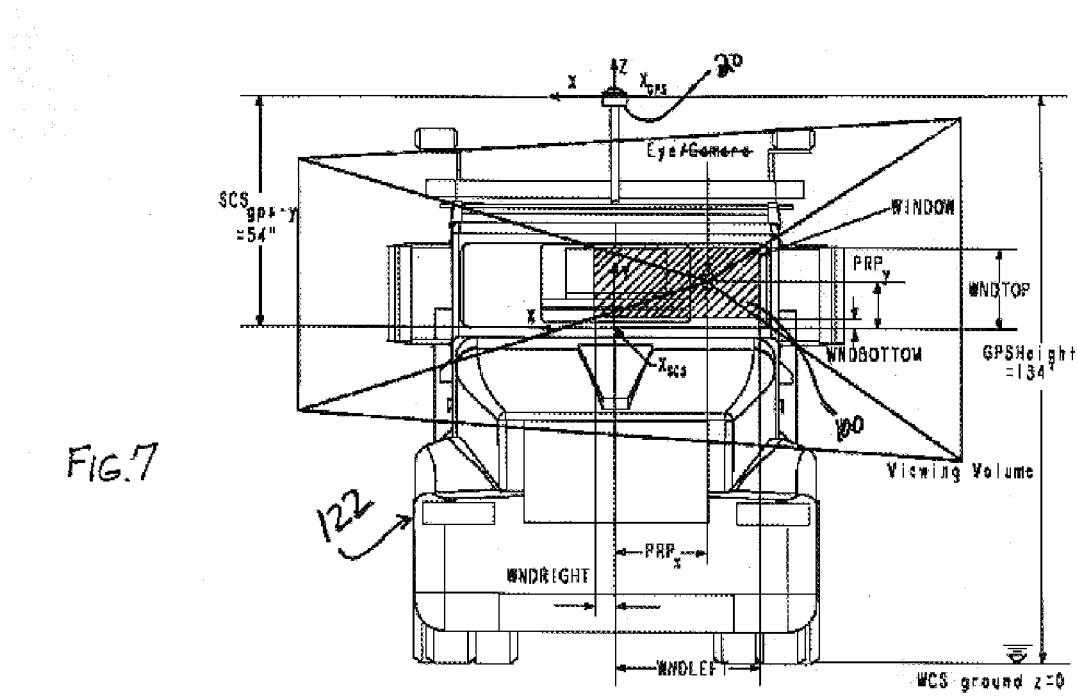
FIG. 7 is a front view of the vehicle shown in FIG. 6.

FIG. 6 is a depiction of a plan view of host vehicle 122, and FIG. 7 depicts host vehicle 122 from the front. Similar items to those in previous figures are similarly numbered. The origin of $X_{GPS}$ is the GPS antenna 28 on the host vehicle 122. The X axis points towards the right side 124 of the host vehicle 122, the Y axis points along the longitudinal axis 125 of the host vehicle 122 towards the front and the Z axis points vertically upward.

Given the following:
1. $\{^{WCS}x, ^{WCS}y\}$ are the coordinates of the host vehicle GPS antenna 28 in the WCS (in meters).
2. The GPS antenna 28 is at a height of GPSHeight meters above the ground (z=0 plane of the WCS). In one example embodiment, GPSHeight=3.4036 m. (134")
3. $\theta_2$ is the angle (in radians) between the longitudinal axis 125 of the host vehicle 122 and east direction (the X axis of the WCS). leads to:

$$X_{GPS} = \text{Trans}(^{WCS}x, ^{WCS}y, \text{GPSHeight}) \cdot \text{Rot}z(\theta_2 - \pi/2) \qquad \text{Eq. 12}$$

Measurements of the eye position (or camera position) and field of view need to be taken with respect to some coordinate system located inside the host vehicle cabin because the driver's eye (or camera) is located there. Therefore, we introduce another coordinate system called the windshield coordinate system.

The windshield coordinate system is given by the homogeneous transformation matrix $X_{SCS}$ with respect to World Coordinate System. The origin of $X_{SCS}$ is the midpoint of the lower edge of the windshield as shown in FIG. 7. The windshield lies in the XY plane of the $X_{SCS}$. The windshield plane is assumed to be perpendicular to the ground (z=0 plane of the WCS) in order to simplify measurements. The X axis points right, the Y axis point vertically up and the Z axis of the $X_{SCS}$ points inward into the vehicle (towards the driver's eye).

This means that if $X_{GPS}$ is rotated through an angle of $\pi/2$ about the X axis and then translated to the $X_{SCS}$ origin, then $X_{GPS}$ will coincide with $X_{SCS}$.

Hence, given the following:
1. $^{SCS}$gps_x=X coordinate of GPS antenna in $X_{SCS}$ coordinates=0
2. $^{SCS}$gps_y=Y coordinate of GPS antenna in $X_{SCS}$ coordinates=1.3716 m (54")
3. $^{SCS}$gps_z=Z coordinate of GPS antenna in $X_{SCS}$ coordinates=1.143 m (45")

this leads to:

$$X_{SCS} = X_{GPS} \cdot \text{Rot}x(\pi/2) \cdot \text{Trans}(-^{SCS}\text{gps}\_x, -^{SCS}\text{gps}\_y, -^{SCS}\text{gps}\_z) \qquad \text{Eq. 13}$$

The following parameters are required to calculate the forward transformation. The location of the camera is conveniently measured in the $X_{SCS}$ coordinate system. Given the following:
1. PRPx=X coordinate of camera lens in $X_{SCS}$ coordinates
2. PRPy=Y coordinate of camera lens in $X_{SCS}$ coordinates
3. PRPz=Z coordinate of camera lens in $X_{SCS}$ coordinates The camera position in $X_{SCS}$ is:

$$^{SCS}\text{PRP} = [\text{PRP}x\ \text{PRP}y\ \text{PRP}z\ 1]' \qquad \text{Eq. 14}$$

The window 100 hence lies on the windshield, i.e. the XY plane of $X_{SCS}$. The hatched rectangle in FIG. 7 is the window. Given that,
1. WNDLEFT=Minimum X coordinate on the windshield corresponding to the window;
2. WNDRIGHT=Maximum X coordinate on the windshield corresponding to the window;
3. WNDBOTTOM=Minimum Y coordinate on the windshield corresponding to the window;
4. WNDTOP=Maximum Y coordinate on the windshield corresponding to the window;

where all coordinates are $X_{SCS}$ coordinates, the window is given by Eq. 1.

The near clipping plane 118 (z=F), coincides with the window (z=0). Hence, all items between the eye and the windshield will be clipped out. Thus, $$F = 0 \qquad \text{Eq. 15}$$

The viewing volume 106 illustratively has a height of 1 km, i.e. the forward view will include all vertices within 1 km of the windshield. Therefore the far clipping plane 120 (z=B) is at a distance of 1 km from the window (z=0). Thus, $$B = -1000 \qquad \text{Eq. 16}$$

Assuming that the eye (or camera) is in a fixed position and does not change orientation, $X_{VRC}=X_{SCS}$. However any subsequent change in orientation changes the projection plane 98 as well. The windshield no longer remains the projection plane 98. The changes in orientation are accommodated by two angles, the yaw angle camyaw and roll angle camroll, given in degrees.

$$X_{VRC} = X_{SCS} \cdot Trans(PRPx, PRPy, PRPz) \cdot \qquad \text{Eq. 17}$$
$$Rotz(camroll \cdot \pi/180) \cdot Roty(camyaw \cdot \pi/180) \cdot$$
$$Trans(-PRPx, -PRPy, -PRPz)$$

The above transformation can readily be recognized as a similarity transformation. The yaw and roll take place in a temporary coordinate system defined at the camera lens such that the axes of this coordinate system are parallel to $X_{SCS}$. This coordinate system is obtained by translating to the camera position. The coordinate system is then rolled about the host longitudinal axis 125 and yawed about the vertical axis and then translated back to the same vector that the $X_{SCS}$ initially made with the camera lens. This allows the camera (or drivers head) to roll and yaw, thereby removing the restraint that the projection plane 98 be the windshield. However, the projection plane is still located at the same distance from the camera. It is important to note that the window stays the same because it is defined with respect to the $X_{VRC}$ coordinate system and lies in the XY plane of the $X_{VRC}$ coordinate system and so is immune to changes in the $X_{VRC}$ coordinate system itself. Also note that for zero yaw and zero roll, $$X_{VRC} = X_{SCS} \cdot Trans(PRPx, PRPy, PRPz) \cdot Rotz(0) \cdot \qquad \text{Eq. 18}$$
$$Roty(0) \cdot Trans(-PRPx, -PRPy, -PRPz)$$
$$= X_{SCS}$$

The camera yaw does not affect the position of the camera relative to the new projection plane 98 because the yaw axis is parallel to the projection plane. However, the roll angle has to be accommodated.

$$PRP = Rotz(-camroll \cdot \pi/180) \cdot {}^{SCS}PRP \qquad \text{Eq. 19}$$

Again, note that for zero roll, $$PRP = Rotz(0) \cdot {}^{SCS}PRP = {}^{SCS}PRP \qquad \text{Eq. 20}$$

With the parameters set in this way, the forward transformation can now be computed. The entire forward transformation sequence is illustrated by the flow diagram of FIG. 8A. The forward transformation begins by defining the viewing volume 106 as mentioned above and indicated by block 130 in FIG. 8A. The eye/camera or the PRP 102 is located on the host vehicle 122 and so is attached to and moving with the host coordinate system $X_{GPS}$. This continuously changes the viewing volume 106 and the view reference coordinate system $X_{VRC}$, which is given by Equation 17.

Once the view reference coordinate system is computed, the next step is to compute the normalizing viewing transformation $N_{per}$ as indicated by block 132. This 4×4 matrix transformation converts the arbitrarily shaped viewing volume 106 to a "normal" or canonical volume. The lines are clipped against the canonical volume using the known Liang-Barsky algorithm. Clipping involves rejecting lines if they lie completely outside the viewing volume 106 or computing intersections if they lie partly inside the viewing volume 106 and adjusting one or both line endpoints as need be. Clipping is indicated by block 134.

Once the lines are clipped, controller 12 determines whether the line will be visible. This is indicated by block 136. If not, the next line is selected as indicated by block 138. If the line will be visible, it must be projected.

The process of projection (illustrated by block 140) converts the frustrum shaped canonical volume to a box shaped canonical volume. Once this is done, the dimension of depth is discarded to get a 2D representation of a 3D world. This 2D space is then mapped to another 2D space called the viewport, which is the rendering area on the computer screen. This is indicated by block 142. Once mapped to the viewport, the 2D space can be rendered to the computer screen (or projector). This is indicated by block 144. This completes the forward transformation.

An example may be helpful.

Figure 10:
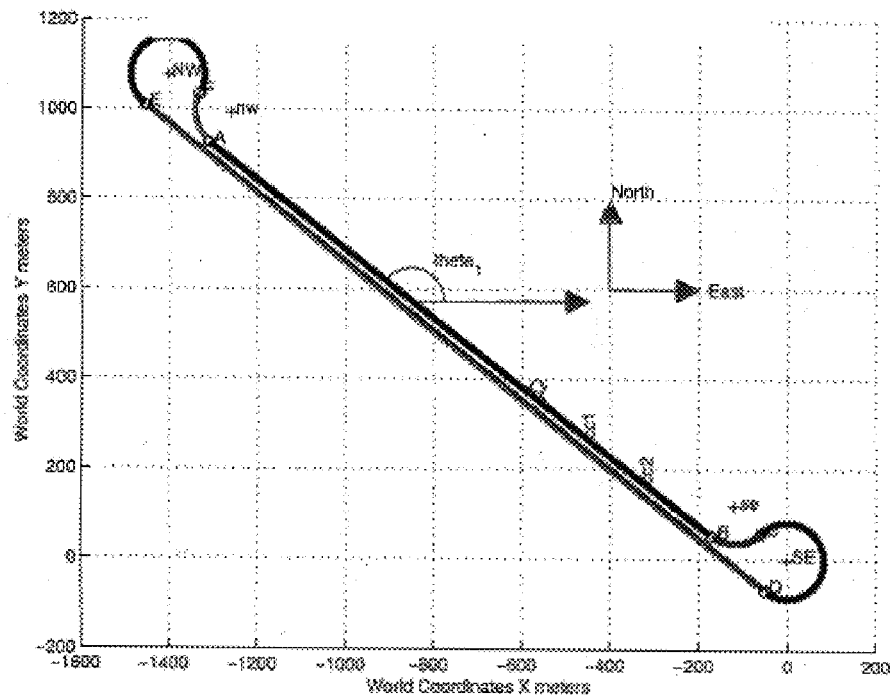

The MnRoad Low Volume Road (LVR) is located at the Minnesota Department of Transportation (MnDOT) facility at Albertville, Minn., and will be used as the basis of this example. FIG. 10 is a plan view of the LVR and shows that it consists of two 12' wide lanes looping back on themselves. The lanes are separated by a continuous double yellow lane stripe called the center lane stripe CL represented by the loop ABCDEFA in FIG. 10.

The center line stripe CL consists of the following six segments:

1. Two large arcs CD and EF with a radius of curvature 275' which subtend an angle of 262 deg 03 min 26.4 sec.
2. Two small arcs BC and FA with a radius of curvature 275' which subtend an angle of 82 deg 03 min 26.5 sec.
3. Two straight lines AB and DE that are inclined at an angle $\theta_1 = +142.6°$ from the east.

The CL can be described by the ten points that define its geometry. Four of the points, viz. The letters se, nw, SE and NW, represent the centers of the four curved sections, while the other six, viz. A, B, C, D, E and F represent the starting points for the six segments. These ten points were made available in Wright County coordinates. They were converted to Minnesota South State Plane coordinates using the publicly available MnCon software provided by the Minnesota Department of Transportation. This software converts coordinates between any two of 232 map projections including the three Minnesota State plane zones in both NAD27 and NAD83 coordinates.

In addition to the ten points which describe the geometry, there are two more points cc1 and cc2. These points represent the centers of two "calibration squares", which are 12'×12' squares marked on the track, with the edges of the square parallel to the center line stripe.

The coordinates of these twelve points in the Wright county, the Minnesota South State Plane coordinate systems and the World Coordinate System are given in Table 1.

TABLE 1

Locations of points that define the MnRoad LVR geometry

|  | Wright County (NAD 83) | | Minnesota South State Plane (NAD 83) | | World Coordinates | |
| --- | --- | --- | --- | --- | --- | --- |
|  | X (ft) | Y (ft) | X (m) | Y (m) | X (m) | Y (m) |
| E | 547053.871 | 202341.018 | 823499.057 | 350944.831 | 0 | 0 |
| W | 542446.542 | 205872.621 | 822093.278 | 352019.267 | −1405.779 | 1074.436 |
| e | 546667.779 | 202732.723 | 823381.213 | 351064.055 | −117.844 | 119.224 |
| w | 542925.104 | 205601.553 | 822239.256 | 351936.852 | −1259.801 | 992.021 |
|  | 542757.806 | 205383.295 | 822188.358 | 351870.258 | −1310.699 | 925.427 |
|  | 546500.480 | 202514.466 | 823330.315 | 350997.461 | −168.742 | 52.630 |
|  | 546860.825 | 202536.871 | 823440.135 | 351004.443 | −58.922 | 59.612 |
|  | 546886.572 | 202122.761 | 823448.159 | 350878.237 | −50.898 | −66.594 |
|  | 542279.243 | 205654.364 | 822042.380 | 351952.673 | −1456.677 | 1007.842 |
|  | 542685.823 | 205737.087 | 822166.267 | 351978.060 | −1332.790 | 1033.229 |
| c1 | — | — | 823049.274 | 351212.381 | −449.782 | 267.550 |
| c2 | — | — | 823179.943 | 351112.433 | −319.114 | 167.602 |

The inner lane has an 8′ wide shoulder and the outer lane has a 12′ wide shoulder. Thus the entirety of the LVR can be thought to be composed of five polylines—the center lane stripe, the outer lane boundary, the inner lane boundary, the outer shoulder and the inner shoulder. The inner shoulder boundary (IS), the inner lane boundary (ILB), the outer lane boundary (OLB) and the outer shoulder boundary (OS) are offset from the CL at lateral distances of −20′, −12′, +12′ and +24′ respectively. Negative lateral distance for a loop implies that the loop lies within the area enclosed by the CL and positive offset distances imply otherwise. The road database that serves the virtual mirror application is made up of four linked lists of lines—the first contains the inner shoulder and the inner lane boundary, the second contains the CL, the third contains the outer lane boundary and the outer shoulder and the fourth contains the two calibration crosses.

Figure 9:
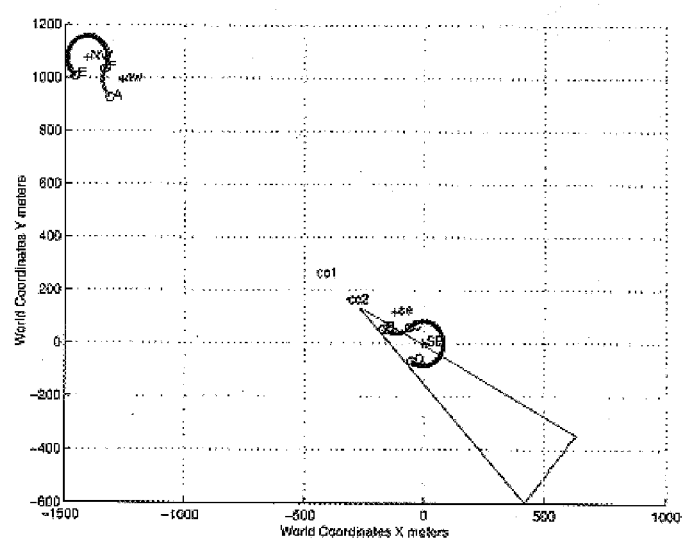
FIGS. 9-18 illustrate the generation of a virtual mirror display in accordance with a forward transformation for a particular position on a test track (FIG. 10).

FIG. 9 shows a plan view of the viewing volume 106 when the host vehicle 122 is located on an outside shoulder of the LRV. The two straightway sections (between AB and DE) are not shown in FIG. 9 for clarity.

The host vehicle position and orientation are given by the following equations and these values are used in the subsequent calculations as an example of but one position only. As the vehicle moves, these values will, of course, be updated:

$$^{WCS}x = -269.30 \quad \text{Eq. 21}$$

$$^{WCS}y = 136.90 \quad \text{Eq. 22}$$

$$\theta_2 = \theta_1 + \pi \quad \text{Eq. 23}$$

where, $$\theta_1 = 142.6 \cdot \pi/180 \quad \text{Eq. 24}$$

$\theta_1$ is the orientation of the center line stripe relative to the east direction and is equal to 142.6 degrees. With this information, the coordinate systems $X_{GPS}$ and $X_{SCS}$ can be computed from Equations 12 and 13, respectively.

The camera position $^{SCS}$PRP is then measured. Recall from Equation 14, that $^{SCS}$PRP is simply the vector location of the camera lens (or equivalent eye position) with respect to the $X_{SCS}$ coordinate system. Let us assume that the measurements are as follows:

$$PRPx = 0.127 \quad \text{Eq. 25}$$

$$PRPy = 0.2921 \quad \text{Eq. 26}$$

$$PRPz = 0.7112 \quad \text{Eq. 27}$$

These numbers imply that the camera lens is 0.127 m (5″) to the right of the windshield origin (i.e. on the passenger side), 0.2921 m (11½″) above the windshield origin and 0.7112 m (28″) away from the plane of the windshield.

The view seen through the camera (or from the eye perspective), after eliminating the portion that will occupy the top 80 rows on the computer screen (that may be reserved for the GUI), is the window 100 which is defined as:

$$\text{WINDOW} = [-0.0135 \; 0.2186 \; 0.3497 \; 0.1978]' \quad \text{Eq. 28}$$

The near and far clipping planes 118 and 120 given by Equations 15 and 16 respectively complete the list of the numerical values required to compute the forward transformation. This also completes the requirements to define the viewing volume 106 as illustrated by block 130 in FIG. 8A.

Figure 11:
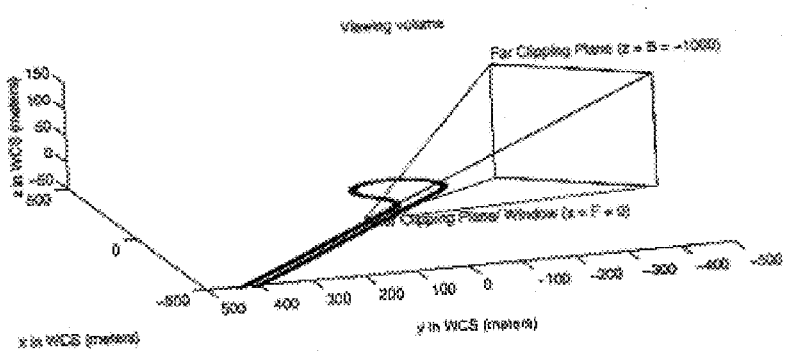
Figure 12:
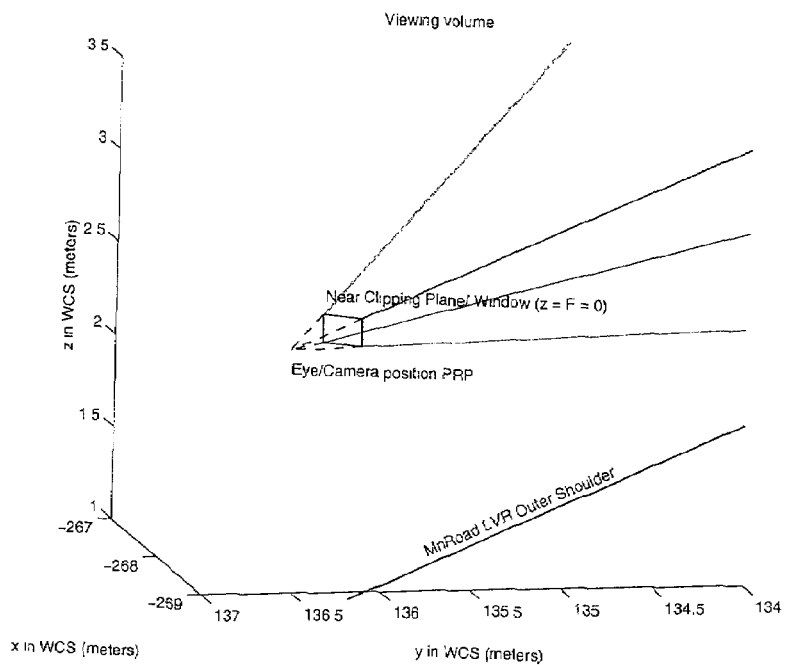

FIG. 11 shows the viewing volume 106 from a 3D viewpoint. FIG. 12 shows the viewing volume 106 once again, with the view zoomed in to show the window 100 and the near clipping plane 118 (which coincides with the window since F=0). Note that the apex of the viewing volume 106 is the eye/camera position.

Figure 13A:
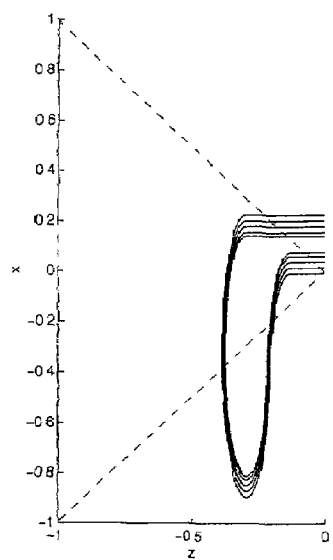
Figure 13B:
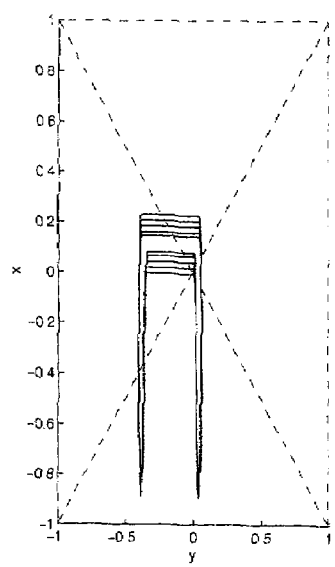

The normalizing viewing transformation $N_{per}$ (represented by block 132 in FIG. 8A) is a 3D space to 3D space transformation that changes the arbitrarily shaped viewing volume to a "normal" shape. This normal shaped viewing volume is called the perspective-projection canonical viewing volume. FIGS. 13A and 13B show two orthographic views of this canonical viewing volume, the edges of the volume being represented by dotted lines. Note that the viewing volume is symmetrical and normalized, i.e. all coordinates inside it have an absolute value of less than or equal to 1. The normalizing viewing transformation moves the PRP 102 to the origin, i.e. PRP=[0 0 0 1]′ after applying the normalizing viewing transformation.

Figure 14:
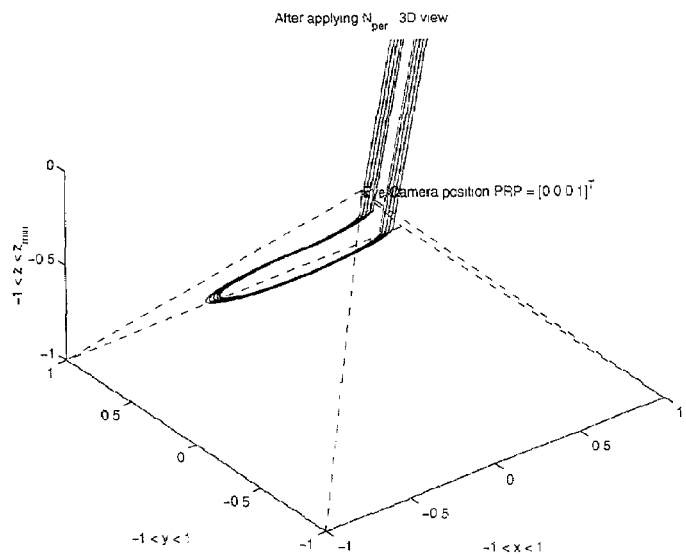

FIG. 14 shows a 3D view for the lines that define the lane boundaries for the example (i.e., at MnRoad) after they have undergone the normalizing viewing transformation. FIG. 14 presents the same information as FIGS. 13A and 13B.

The canonical perspective viewing volume is still a truncated frustrum of a four-sided pyramid with its apex located at the origin of the World Coordinate System. Its six faces are given by:
1. The near clipping plane 118 $z = z_{min}$, where $-1 < z_{min} < 0$. ($z_{min}$ is given by Eq. 35 below)
2. The far clipping plane 120 $z = -1$
3. The plane $x = z$ (the lower dotted line in FIG. 13A)

4. The plane x=−z (the upper dotted line in FIG. 13A)
5. The plane y=z
6. The plane y=−z By reducing the arbitrary viewing volume to a standard shape, it becomes straightforward to apply a transformation-independent clipping algorithm to the standard shape.

The normalizing viewing transformation $N_{per}$ is given by $$N_{per} = S_{per} \cdot SH_{per} \cdot \text{Trans}(-PRP(1), -PRP(2), -PRP(3)) \cdot X_{VRC}^{-1} \qquad \text{Eq. 29}$$

where, $S_{per}$=Scaling Matrix $$S_{per} = \begin{bmatrix} \frac{2 \cdot VRP'(3) \cdot (VRP'(3)+B)}{WINDOW(2)-WINDOW(1)} & 0 & 0 & 0 \\ 0 & \frac{2 \cdot VRP'(3) \cdot (VRP'(3)+B)}{WINDOW(4)-WINDOW(3)} & 0 & 0 \\ 0 & 0 & \frac{-1}{VRP'(3)+B} & 0 \\ 0 & 0 & 0 & 1 \end{bmatrix} \qquad \text{Eq. 30}$$

where, $$VRP' = SH_{per} \cdot \text{Trans}(-PRP(1), -PRP(2), -PRP(3)) \cdot [0\ 0\ 0\ 1]' \qquad \text{Eq. 31}$$

PRP(n), n=1, 2, 3 are the $n^{th}$ elements of the 4×1 vector PRP (given by Eq. 19)

VRP'(3)=$3^{rd}$ element of the 4×1 vector VRP'

B=far clipping plane distance from the projection plane=−1000 (meters)

WINDOW(n), n=1, 2, 3, 4 are the $n^{th}$ elements of the 4×1 vector WINDOW $SH_{per}$=Shearing Matrix $$SH_{per} = \begin{bmatrix} 1 & 0 & -DOP(1)/DOP(3) & 0 \\ 0 & 1 & -DOP(2)/DOP(3) & 0 \\ 0 & 0 & 1 & 0 \\ 0 & 0 & 0 & 1 \end{bmatrix} \qquad \text{Eq. 32}$$

where,

CW=Center of the Window $$CW = \begin{bmatrix} \frac{WINDOW(1)+WINDOW(2)}{2} & \frac{WINDOW(3)+WINDOW(4)}{2} & 0 & 1 \end{bmatrix}' \qquad \text{Eq. 33}$$

DOP=Direction of Projection Vector $$DOP = CW - PRP \qquad \text{Eq. 34}$$

DOP(n), n=1, 2, 3 are the nth elements of the 4×1 column vector DOP.

Each line is assigned a pair of 4×1 column vector endpoints at inception. These coordinates are $\{v_0, v_1\}$ in world coordinates, i.e. defined with respect to the World Coordinate System. All the subsequent results of transformation via matrix multiplication are stored in another pair of 4×1 column vectors $\{v_0\text{clip}, v_1\text{clip}\}$. Then, for the transformation stage:

$$v_0\text{clip} = N_{per} \cdot v_0 \qquad \text{Eq. 35}$$

$$v_1\text{clip} = N_{per} \cdot v_1 \qquad \text{Eq. 36}$$

Figure 8A:
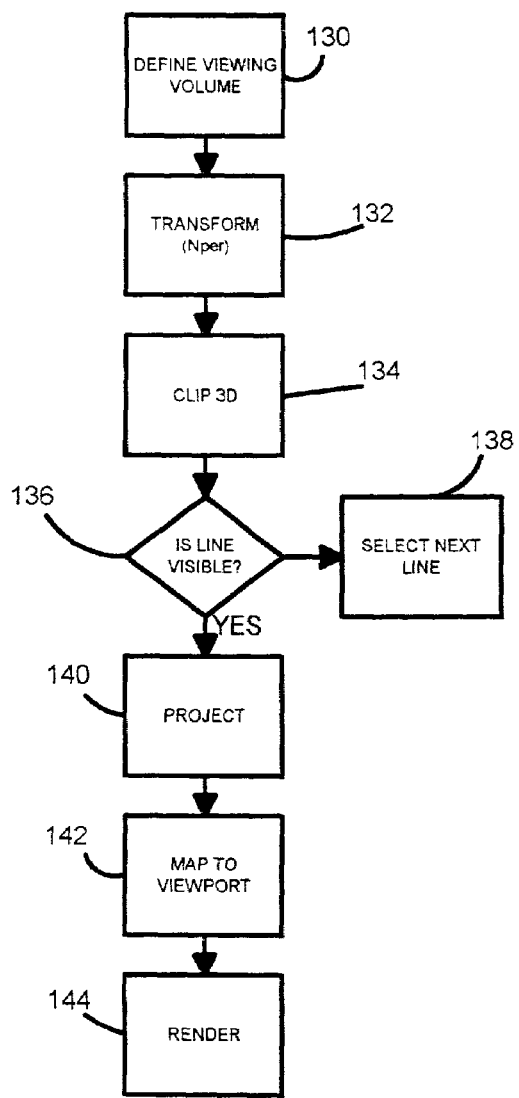
FIG. 8A is a flow diagram of a forward transformation sequence.

The lines are now clipped against the six faces of the canonical viewing volume using the Liang-Barsky clipping algorithm, as indicated by block 134 in FIG. 8A.

Figure 15:
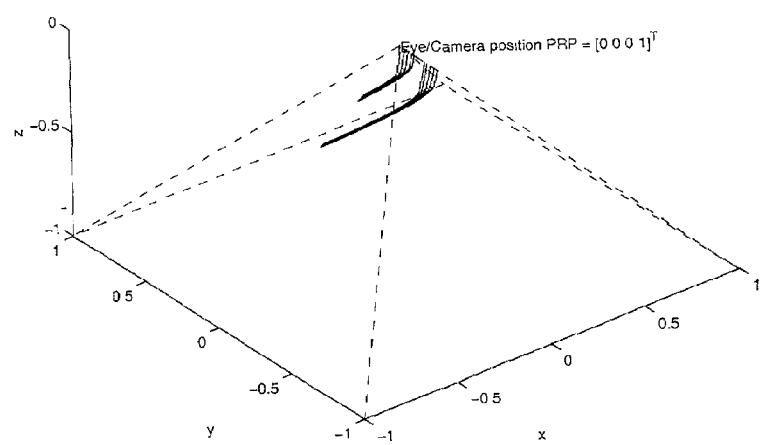

FIG. 15 shows the lines defining the road lane boundaries for the present example (i.e., the MnRoad lane boundaries) after the clipping stage. The affect of clipping can be seen by comparing FIG. 15 with FIG. 14. Lines lying inside the viewing volume are identified as visible (as indicated by block 136 in FIG. 8A) and are further processed through projecting, mapping and rendering.

The function call for clipping is:

$$[v_0\text{clip}, v_1\text{clip}, \text{visible}] = \text{Clip3D}(v_0\text{clip}, v_1\text{clip}, z_{min})$$

The parameters passed to the Liang-Barsky clipping function Clip3D( ) are the (transformed) line endpoints $v_0\text{clip}$ and $v_1\text{clip}$ and the constant $z_{min}$ which defines the near clipping plane 118.

$$z_{min} = -\frac{VRP'(3)+F}{VRP'(3)+B} \qquad \text{Eq. 37}$$

where,

VRP'(3)=the third element of the 4×1 vector VRP' (given by Eq. 31).

If the line lies partly or completely inside the viewing volume, then the Clip3D function sets a visible variable to 1. The endpoints $v_0\text{clip}$ and $v_1\text{clip}$ are adjusted if the line lies partly inside the clipping volume. If the line is not visible (does not lie inside the viewing volume), then the visible variable is set to 0 and the line is excluded from the projection and mapping to viewport stages that follow.

Figure 16:
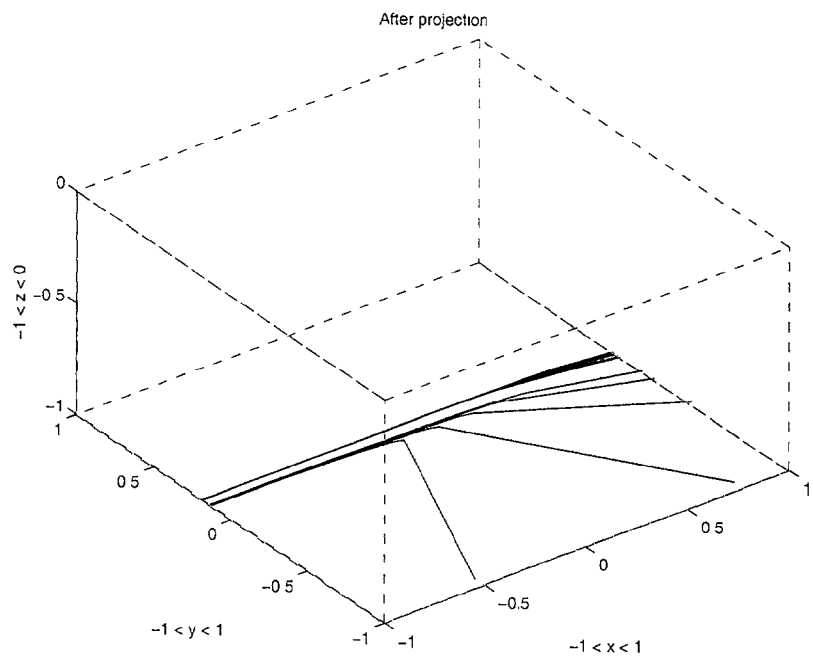

After applying the projection transformation and homogeneous division (as discussed below), the frustrum shaped viewing volume of FIG. 15 is transformed into the box shaped parallel-projection viewing volume as shown in FIG. 16.

The parallel-projection volume is given by its six planes z=0, z=−1, x=−1, x=1, y=−1 and y=1.

The projection transformation matrix M is given by:

$$M = \begin{bmatrix} 1 & 0 & 0 & 0 \\ 0 & 1 & 0 & 0 \\ 0 & 0 & \frac{1}{1+z_{min}} & \frac{-z_{min}}{1+z_{min}} \\ 0 & 0 & -1 & 0 \end{bmatrix} \qquad \text{Eq. 38}$$

Each visible vertex from the previous (clipping) stage is multiplied by this projection matrix.

$$v_0 \text{clip} = M \cdot v_0 \text{clip} \qquad \text{Eq. 39}$$

$$v_1 \text{clip} = M \cdot v_1 \text{clip} \qquad \text{Eq. 40}$$

As can be seen, the last row of the matrix M is not [0 0 0 1]. Hence this transformation converts the vertices into what is called the homogeneous coordinates [x y z w]' where w is not equal to 1. To convert homogeneous coordinates back to 3D coordinates, each element of the 4×1 column vector ($v_0$clip or $v_1$clip) has to be divided by w. This is called homogeneous division.

Hence, $$v_0 \text{clip} = 1/v_0 \text{clip}(4) \cdot v_0 \text{clip} \qquad \text{Eq. 41}$$

$$v_1 \text{clip} = 1/v_1 \text{clip}(4) \cdot v_1 \text{clip} \qquad \text{Eq. 42}$$

Note that $v_0$clip(4) and $v_1$clip(4) are the $4^{th}$ elements of the 4×1 column vectors $v_0$clip and $v_1$clip respectively.

After homogeneous division, the Z coordinate denotes the depth of the point. As can be seen from FIG. 16, the depth is a floating point between [0–1]. Graphic cards usually represent depth by an integer. For a graphic card having a 32 bit depth buffer, there are 0 to $2^{32}-1$ levels of depth. During the final rendering stage, the graphic card does a sort on the depth of the pixel for all points having the same X and Y coordinate and correctly renders that point having the least depth, thereby occluding points which lie behind the nearest point. Since only lines are being drawn, the depth of the point does not matter and so the Z coordinates of $v_0$clip and $v_1$clip are ignored (taken as 0).

Figure 17:
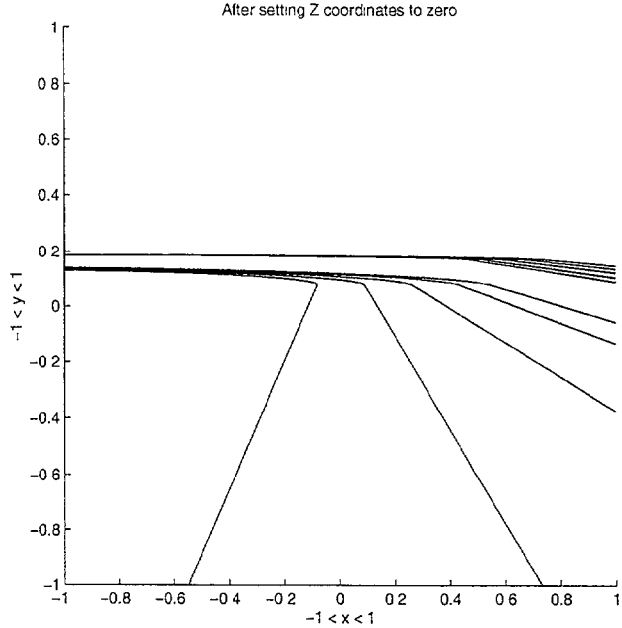

FIG. 17 shows the lines after projection and setting their Z coordinates to zero. As seen in FIG. 17, projection and homogeneous division encapsulates the view in a 2D rectangle bounded by −1<x<1 and −1<y<1. Mapping to the viewport (indicated by block 142 in FIG. 8A) consists of mapping this 2D space to another 2D space that is VIEWPORT_W wide× VIEWPORT_H high.

Most graphic device contexts define their origin as (0,0) at the upper left corner, and the X coordinate increases from left to right, and the Y coordinate increases from top to bottom. Therefore, the origin of the projected coordinate system is first translated from (0,0) to the upper left corner (−1, +1). The X axis is then scaled up by VIEWPORT_W/2 and the Y axis scaled up by VIEWPORT_H/2 and then the Y coordinates are reflected about the X axis. This is accomplished by the following transformation:

$$M_{Viewport} = S_{Viewport} \cdot T_{Viewport} \qquad \text{Eq. 43}$$
$$= Scale\left(\frac{\text{VIEWPORT\_W}}{2}, -\frac{\text{VIEWPORT\_H}}{2}, 1\right) \cdot$$
$$Trans(-1, 1, 0)$$

For the odd graphic device context which has its origin at the lower left corner, with X coordinates increasing from left to right and the Y coordinate increasing from bottom to top:

$$M_{Viewport} = S_{Viewport} \cdot T_{Viewport} \qquad \text{Eq. 44}$$
$$= Scale\left(\frac{\text{VIEWPORT\_W}}{2}, \frac{\text{VIEWPORT\_H}}{2}, 1\right) \cdot$$
$$Trans(-1, -1, 0)$$

Thus, after applying the viewport transformation $$v_0 \text{clip} = M_{Viewport} \cdot v_0 \text{clip} \qquad \text{Eq. 45}$$

$$v_1 \text{clip} = M_{Viewport} \cdot v_1 \text{clip} \qquad \text{Eq. 46}$$

$v_0$clip and $v_1$clip represent the pixel coordinates of the line endpoints on the graphics device context.

Figure 18:
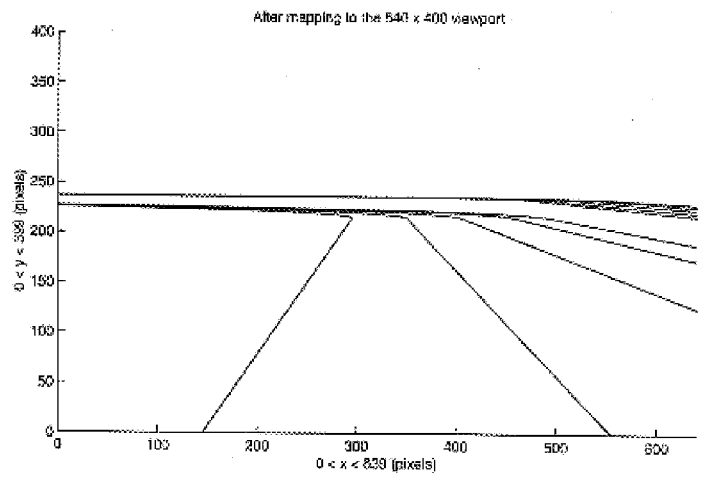

FIG. 18 shows the lines after they have been mapped to the viewport. Compare the lines to FIG. 17, which shows the lines after the previous stage (projection). Note that FIG. 18 is obtained from FIG. 17 by an appropriate 2D translation ($T_{Viewport}$) followed by a 2D scaling ($S_{Viewport}$).

Figure 19:
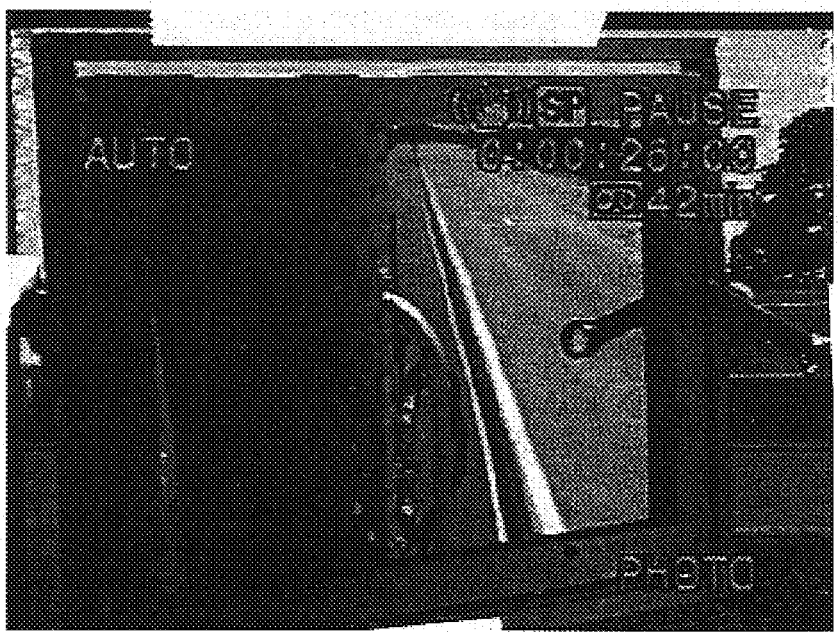
FIG. 19 depicts a camera view of a side mirror on a vehicle.

A camera (or eye) view corresponding to the present example is shown in FIG. 19. The NTSC image from the camera is 640 wide×480 high. The top 80 rows of pixels on the computer screen are occupied by the GUI and the viewport occupies the bottom 400 rows. Hence the window corresponds to the bottom $5/6^{th}$ portion of the camera image of FIG. 19.

Figure 20:
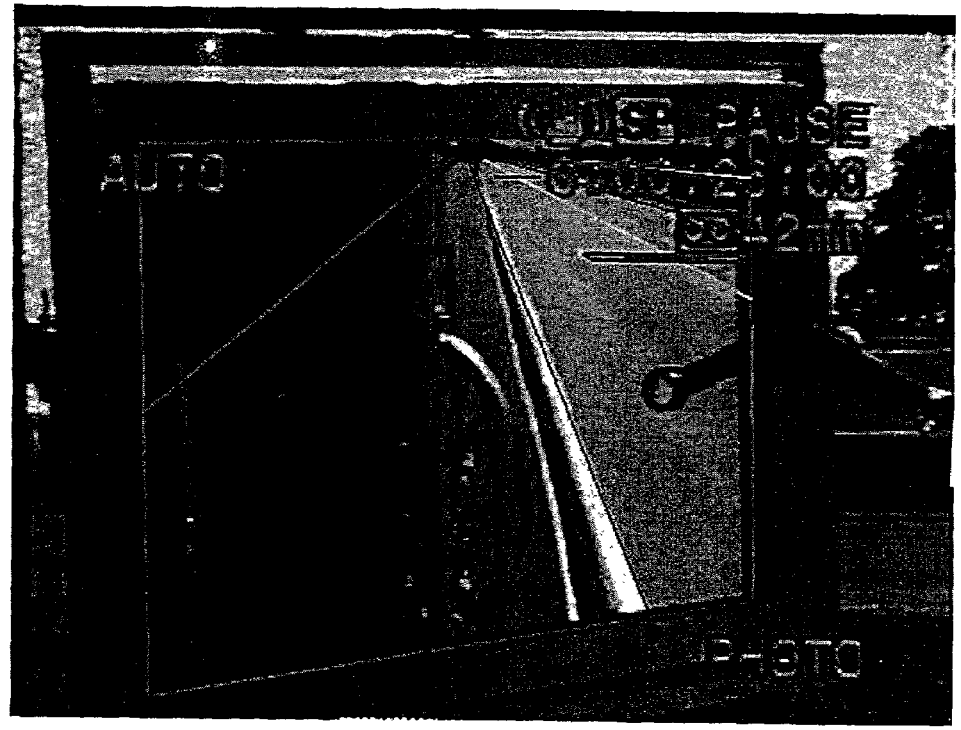
FIG. 20 depicts the camera view of FIG. 19, with the virtual mirror generation overlaid.

FIG. 20 shows a one-on-one comparison between the window 100 as captured by the camera and the viewport 110 as generated by the computer graphics. Note the two calibration squares centered at cc1 and cc2 that are visible in FIG. 20. The images of the camera and the viewport exhibit a positive match. Remember that the goal behind the computer graphics for the forward transformation is to map the 2D contents of the window 100 to the 2D drawing area (viewport) 110 on the computer screen. This goal has thus been achieved.

The Mirror Transformation

Figure 8B:
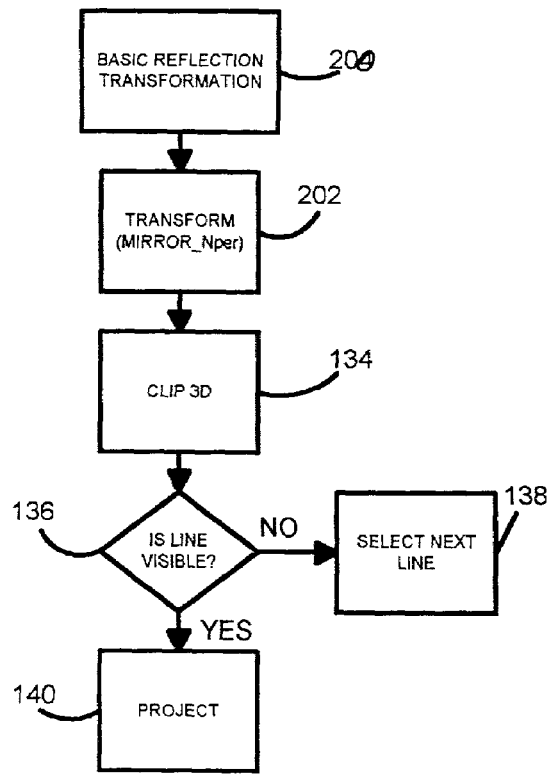
FIG. 8B is a flow diagram illustrating a mirror transformation sequence.

The mirror transformation sequence is shown in greater detail in FIG. 8B. First, the basic reflection transformation transforms a vertex given in world coordinates to its reflected image. This is indicated by block 200. Next, the reflection transformation is combined with the normalizing viewing transformation $N_{per}$ discussed with respect to the forward transformation to give a mirror normalizing viewing transformation Mirror_$N_{per}$. This is indicated by block 202. The rest of the stages of the mirror transformation, viz. clipping and projection are the same as those described previously with the exception of the mapping to the viewport stage, which is not executed. Similar items are similarly numbered.

Each of these items is now discussed, in turn. This section also includes an example of a mirror transformation that includes the mapping to viewport stage and shows how the virtual mirror display will not match with the camera image if this stage is performed. This shows that a link between the mirror transformation and the forward transformation (the stencil transformation) is needed.

The basic reflection transformation is now discussed. A Mirror Coordinate System (MCS) is defined so that the mirror plane lies in its XY plane. If a vertex has coordinates w={x, y, z} with respect to the MCS, then the reflected image of the vertex has coordinates w'={x, y, −z} with respect to the MCS.

Therefore, reflection is achieved by simply flipping the sign of the Z coordinate. This is achieved by premultiplying the vertex w by the scaling matrix $Z_{Mirror}$, where $$Z_{Mirror}=\text{Scale}(1, 1, -1) \qquad \text{Eq. 47}$$

Figure 21:
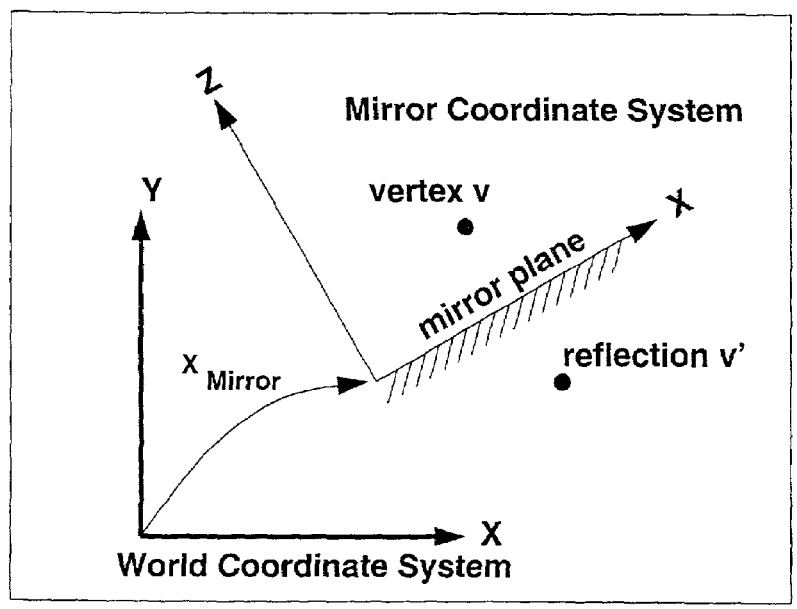
FIGS. 21, 22 and 23 illustrate the coordinates of a reflected vertex in the World Coordinate System relative to a mirror coordinate system.

However, points are not defined in the MCS. They are usually defined with respect to the World Coordinate System (WCS). FIG. 21 shows a vertex v defined with respect to the WCS.

Figure 22:
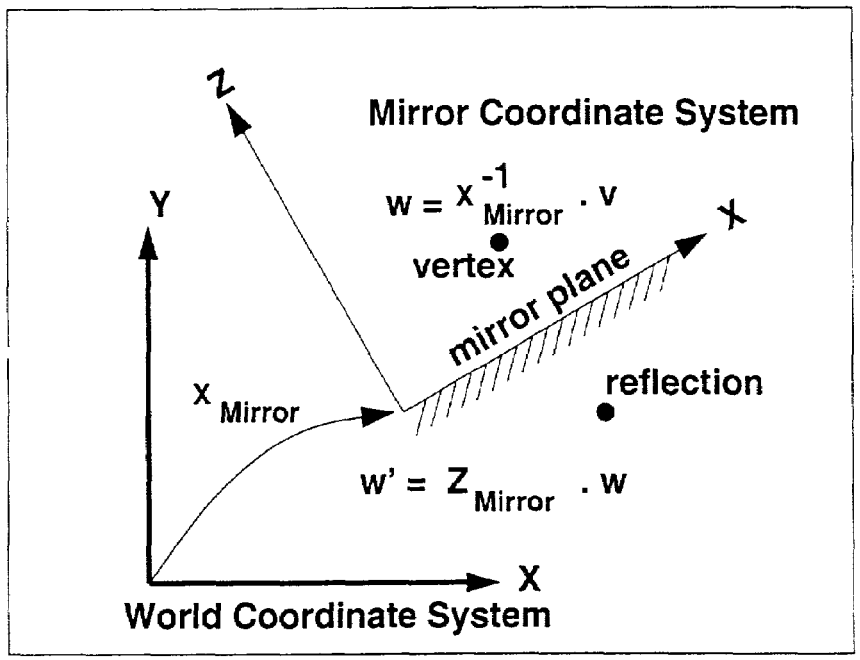

The coordinates of the reflection v' are now derived in world coordinates, and this discussion proceeds with respect to FIG. 22. First, the vertex coordinates w with respect to the MCS are calculated. Since the transformation matrix $X_{Mirror}$ takes the WCS to the MCS, $$w=X_{Mirror}^{-1} \cdot v \qquad \text{Eq. 48}$$

Now the reflected vertex has coordinates w' with respect to the MCS. As already discussed, w' is obtained from w by flipping the sign of the Z coordinate of w, i.e. premultiplying w by the scaling matrix $Z_{Mirror}$.

$$w'=Z_{Mirror} \cdot w=Z_{Mirror} \cdot X_{Mirror}^{-1} \cdot v \qquad \text{Eq. 49}$$

Figure 23:
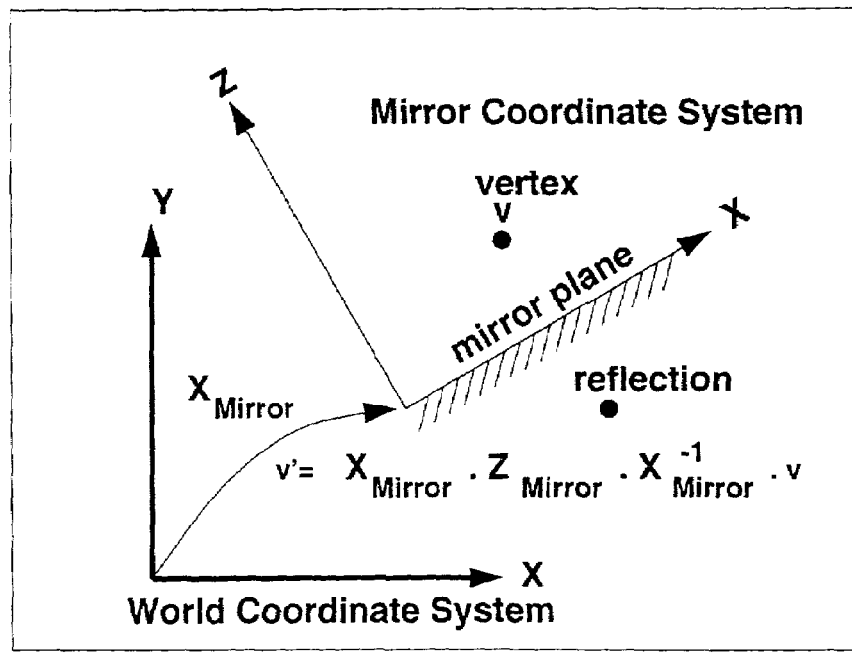

Finally, FIG. 23 shows that the coordinates of the reflected vertex v' are computed with respect to the WCS.

$$v'=X_{Mirror} \cdot w'=X_{Mirror} \cdot Z_{Mirror} \cdot X_{Mirror}^{-1} \cdot v \qquad \text{Eq. 50}$$

Hence the net transformation $R_{Mirror}$ that computes the reflection of a vertex from its world coordinates is:

$$R_{Mirror}=X_{Mirror} \cdot Z_{Mirror} \cdot X_{Mirror}^{-1} \qquad \text{Eq. 51}$$

The mirror coordinate system $X_{Mirror}$ forms the view reference coordinate system $X_{VRC}$ for the mirror transformation. It is given by:

$$X_{Mirror} = X_{GPS} \cdot Trans(^{GPS}Mirror\_x, ^{GPS}Mirror\_y,$$
$$^{GPS}Mirror\_z) \cdot Rotz(\pi/2 + \alpha \cdot \pi/180) \cdot$$
$$Rotx(-\pi/2) \cdot Rotz(\pi) \cdot Rotz(\gamma \cdot \pi/180) \cdot$$
$$Rotx(\beta \cdot \pi/180) \qquad \text{Eq. 52}$$

Figure 24:
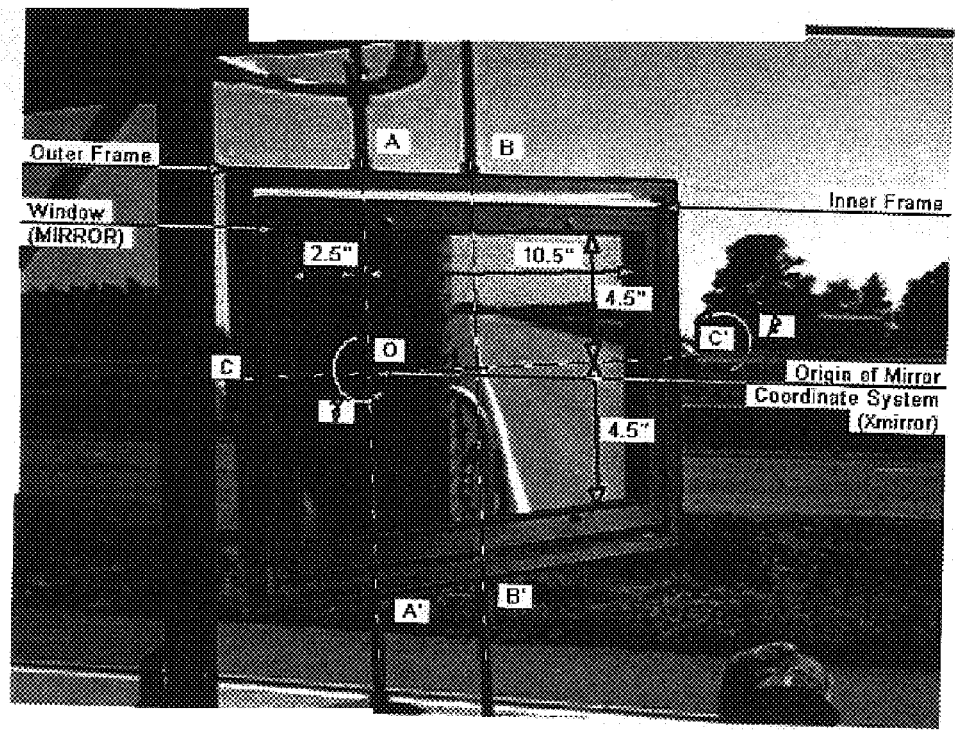
FIG. 24 is a further illustration of a mirror coordinate system in accordance with one illustrative embodiment of the present invention.

FIG. 24 shows that an example mirror is housed in an inner frame that is free to rotate about a horizontal axis CC' with respect to the outer frame. The outer frame has two vertical axes AA' and BB' and may be hinged about axis AA'. In this example the origin of the mirror coordinate system is defined at the intersection about the two axes of rotation AA' and CC'.

Hence the vectors OC' and OA form the X and Y axes of the mirror coordinate system respectively. The X, Y and Z coordinates of the origin of this mirror coordinate system in the $X_{GPS}$ coordinate frame are given by $^{GPS}Mirror\_x$ (47.5"), $^{GPS}Mirror\_y$ (34") and $^{GPS}Mirror\_z$ (−46.5") respectively. The values in meters are given below.

$$^{GPS}Mirror\_x=1.2065 \qquad \text{Eq. 53}$$

$$^{GPS}Mirror\_y=0.8636 \qquad \text{Eq. 54}$$

$$^{GPS}Mirror\_z=-1.1811 \qquad \text{Eq. 55}$$

Figure 25:
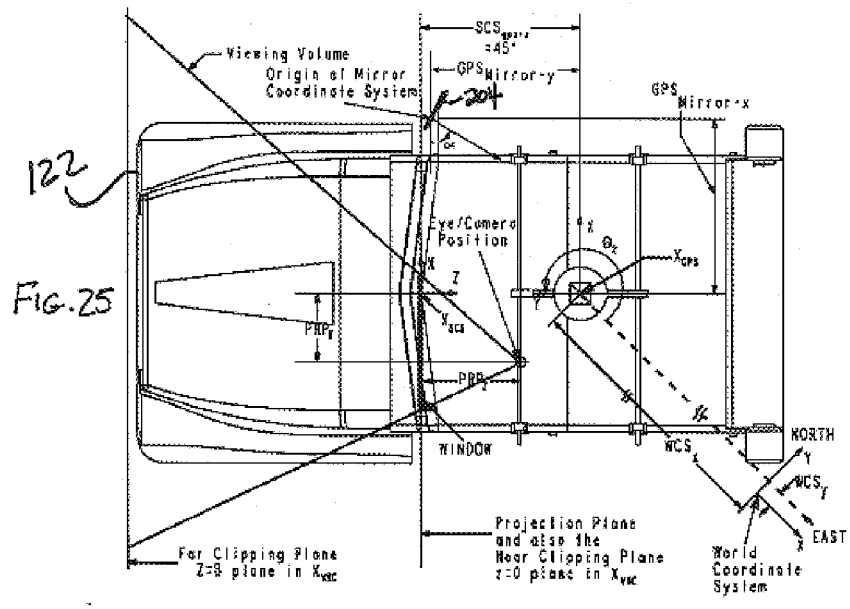
FIG. 25 is a plan view showing the origin of the mirror coordinate system shown in FIG. 24.

FIG. 25 is similar to FIG. 6 but also shows mirror 204 mounted to host vehicle 122. The XY plane of the mirror coordinate system coincides with the reflecting surface of the mirror 204. The mirror 204 may be a first surface reflection mirror, i.e. it reflects from the top surface of the glass and not from the bottom surface, thus eliminating spurious double reflections. The angle α in degrees gives the yaw of the mirror normal (Z axis) with respect to the GPS coordinate system.

FIG. 25 shows that, illustratively, α=90 when the mirror normal is parallel and opposite to the Y axis of the $X_{GPS}$ coordinate system. The two rotations of −π/2 and π about the X and Z axis respectively in Equation 52 bring the Z axis of the mirror coordinate system normal to its reflecting surface. The rotation γ degrees is the rotation of the mirror 204 about the Z axis of the MCS, while the rotation β degrees is the rotation of the inner frame about the axis CC'.

The various parameters required to calculate the mirror transformation are now discussed. The camera position is $^{SCS}PRP=[PRPx\ PRPy\ PRPz\ 1]'$ measured in the windshield ($X_{SCS}$) coordinate system. This position must now be calculated with respect to the mirror coordinate system $X_{Mirror}$, which is the new value for $X_{VRC}$. First, a rotation about the Z axis of the windshield coordinate system accommodates any roll of the camera about the Z axis. Next the matrix $X_{SCS}$ brings the camera position into world coordinates. Finally, the inverse of the mirror coordinate transformation brings the camera position into the mirror coordinate system.

$$MirrorPRP=X_{Mirror}^{-1} \cdot X_{SCS} \cdot$$
$$Rotz(-\text{camroll} \cdot \pi/180) \cdot {}^{SCS}PRP \qquad \text{Eq. 56}$$

If the driver's eye were located at the camera origin, then similar measures would be calculated for the eyes. The mirror 204 is the window 100, in location and size. As noted previously, the mirror 204 can be hinged vertically about the off-center vertical axis AA' and horizontally about the axis CC'. With this choice of axes, the window 100 is:

$$MIRROR=[-2.5 \cdot I2M\ 10.5 \cdot I2M\ -4.5 \cdot I2M\ 4.5 \cdot I2M]' \qquad \text{Eq. 57}$$

where, I2M=0.0254, a factor which converts inches to meters.

The mirror 204 has to be the near clipping plane 118 (z=F) as well the window 100 (z=0).

Otherwise, points behind the mirror 204 will get reflected in front of the mirror 204 and obscure the mirror view from the eye or camera position. Therefore, $$F=0 \qquad \text{Eq. 58}$$

The mirror 204 will display all points lying within 500 meters of the mirror 204 provided they lie in the viewing volume. Hence the far clipping plane 120 (z=B) is at a distance of 500 m from the window 100 (z=0).

$$B=-500 \qquad \text{Eq. 59}$$

As already mentioned, the mirror 204 forms the window 100 and the infinite plane in which the mirror 204 is contained forms the projection plane 98. The mirror coordinate system thus forms the view reference coordinate system.

$$X_{VRC}=X_{Mirror} \qquad \text{Eq. 60}$$

With these parameters, the mirror transformation can be computed. With the exception of a different normalizing viewing transformation and absence of the mapping to the viewport stage, the mirror transformation is the same as the forward transformation. Therefore, it is not discussed in great detail here.

Each vertex is first reflected about the mirror plane using the reflection matrix $R_{Mirror}$ (Equation 51). Once that operation is performed, the reflected vertices can be treated like ordinary vertices in the forward-looking field of view. Therefore, the mirror normalizing viewing transformation is given by $Mirror\_N_{per}$, where $$Mirror\_N_{per}=N_{per} \cdot R_{Mirror} \qquad \text{Eq. 61}$$

where, as per Equation 29, $$N_{per}=S_{per} \cdot SH_{per} \cdot Trans(-PRP(1), -PRP(2),$$
$$-PRP(3)) \cdot X_{VRC}^{-1} \qquad \text{Eq. 62}$$

$$\therefore \text{Mirror\_N}_{per} = S_{per} \cdot SH_{per} \cdot Trans\,(-PRP(1), \quad \text{Eq. 63}$$
$$-PRP(2), -PRP(3)) \cdot X_{VRC}^{-1} \cdot X_{VRC} \cdot$$
$$Z_{Mirror} \cdot X_{VRC}^{-1}$$

or, $$\text{Mirror\_N}_{per} = S_{per} \cdot SH_{per} \cdot Trans\,(-PRP(1), -PRP(2),$$
$$-PRP(3)) \cdot Z_{Mirror} \cdot X_{VRC}^{-1}$$

Figure 26:
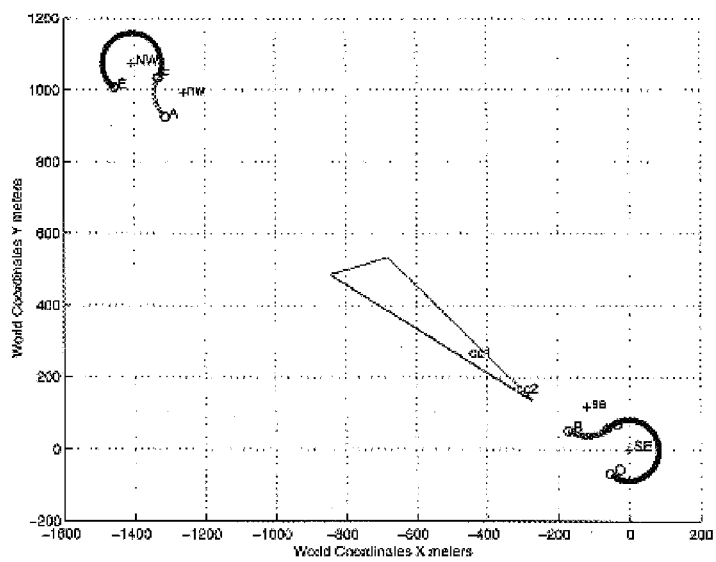
FIGS. 26 and 27 illustrate a plan view of a viewing volume in accordance with one example, and the viewing volume near the near clipping plane, respectively. For clarity, AB and DE are not drawn in FIG. 26.
Figure 27:
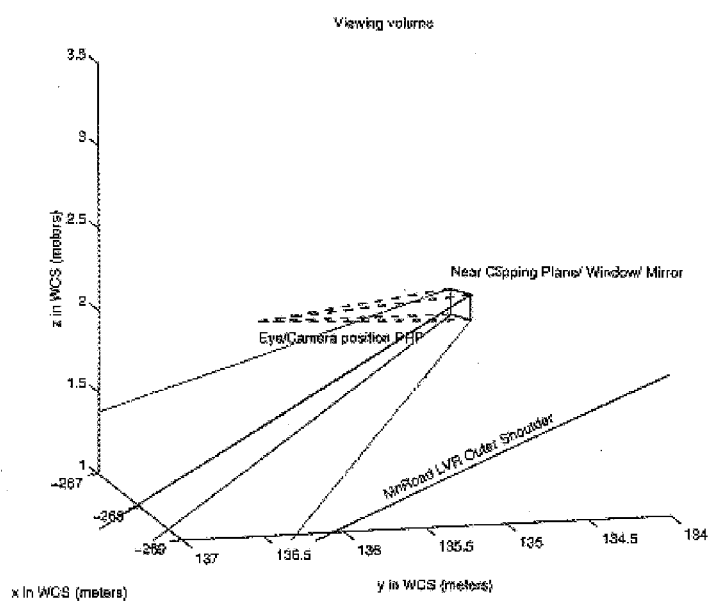
Figure 28:
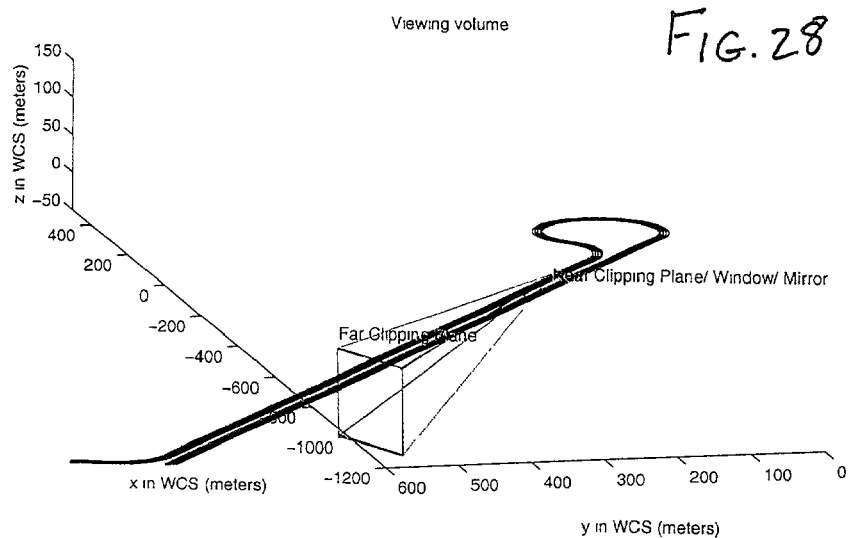
FIG. 28 illustrates the viewing volume near the far clipping plane.

FIGS. 26, 27 and 28 are a plan view, a perspective view from proximate the near clipping plane, and a perspective view from proximate the far clipping plane, respectively, of the viewing volume before the application of the mirror normalizing view transformation to the vertices. In FIG. 26, the straight-line road boundaries on the example road (i.e., the MnRoad LVR) are not shown to enhance clarity.

Figure 29A:
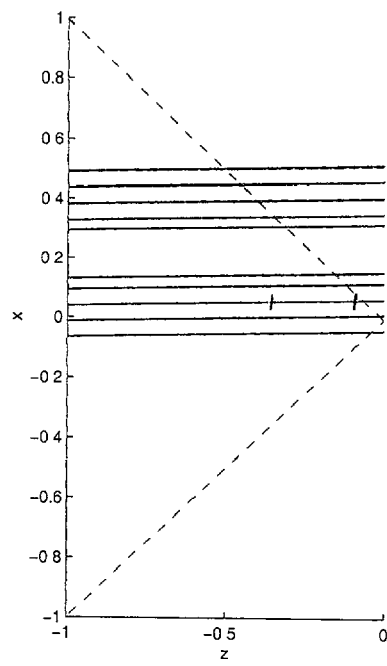
FIGS. 29A and 29B illustrate orthographic views of the viewing volume after applying the mirror normalization viewing transformation.
Figure 29B:
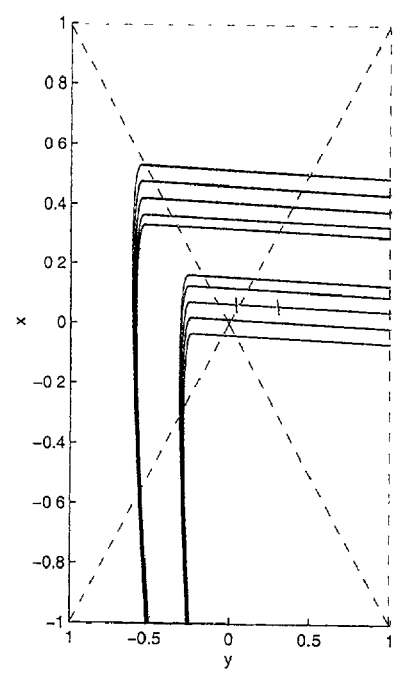
Figure 30:
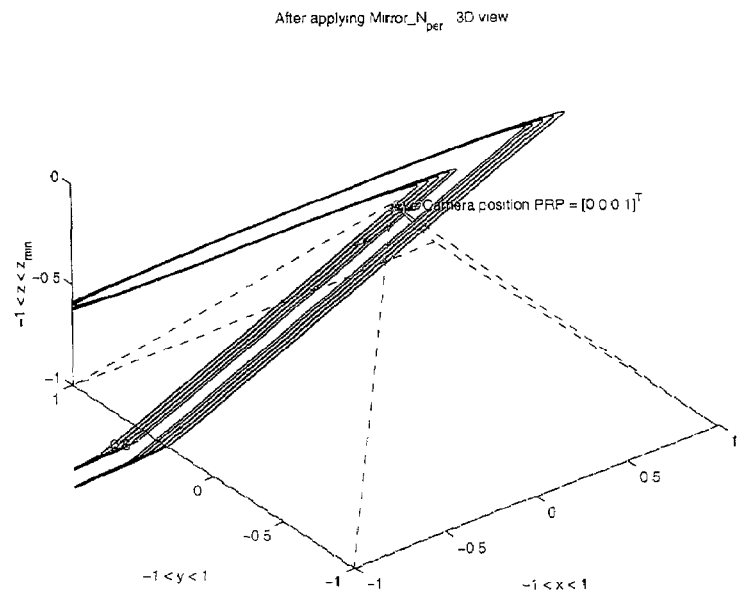
FIG. 30 illustrates the viewing volume in 3 dimensions after applying the mirror normalizing viewing transformation.

FIGS. 29A, 29B and 30 show orthographic views and a 3D view of the viewing volume after the mirror normalizing viewing transformation has been applied. The two small ticks are the 12'×12' calibration squares. The dotted lines form the edges of the perspective-projection canonical viewing volume.

Figure 31:
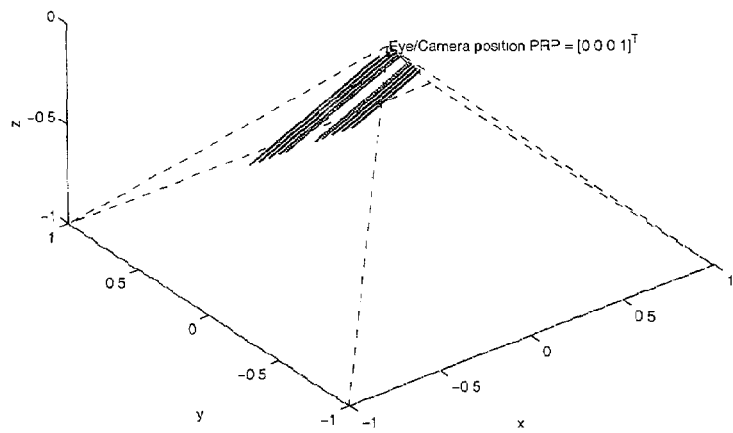
FIG. 31 illustrates the lines of FIG. 30 after they are clipped against six faces of the canonical viewing volume.

As discussed with respect to the forward transformation, clipping is accomplished using the Liang-Barsky clipping algorithm. FIG. 31 provides a 3D view of the lines that make up the example road lane boundaries as they appear after clipping.

Figure 32:
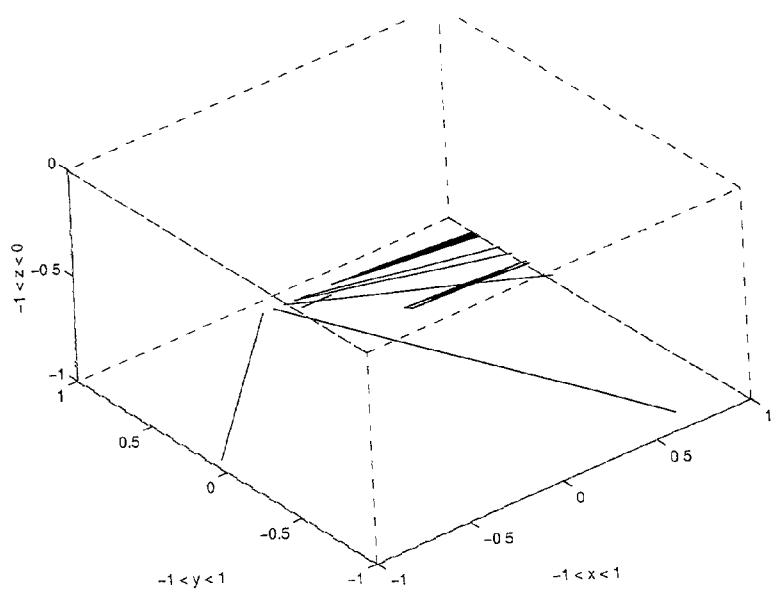
FIG. 32 illustrates lines which lie inside the parallel-projection canonical viewing volume after applying the projection transformation and homogeneous division.

FIG. 32 is a view of the viewing volume after applying the projection transformation and homogeneous division. The viewing volume is box shaped and called the parallel-projection canonical view volume and is shown by dotted lines. The affect of applying the projection transformation and homogenous division can be seen by comparing FIG. 32 with FIG. 31, where the viewing volume is in the shape of a frustum.

Figure 33:
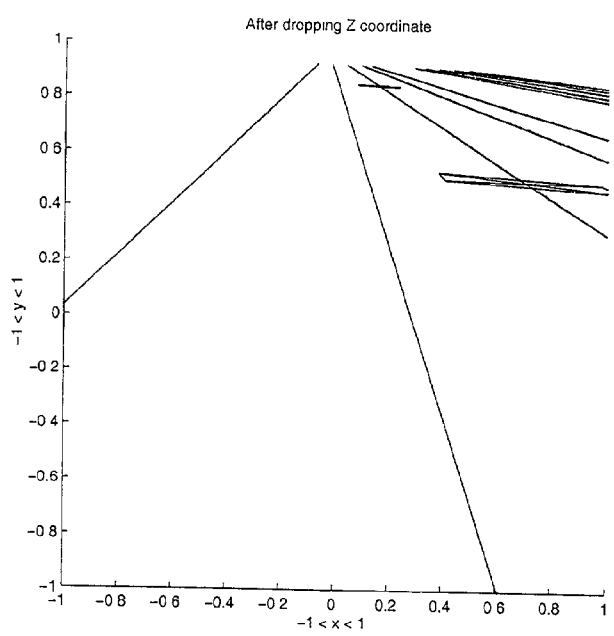
FIG. 33 illustrates the projected view after ignoring the Z coordinate.

The Z coordinates of the lines are then ignored. Therefore, a 2D projected view is obtained as shown in FIG. 33.

Figure 34:
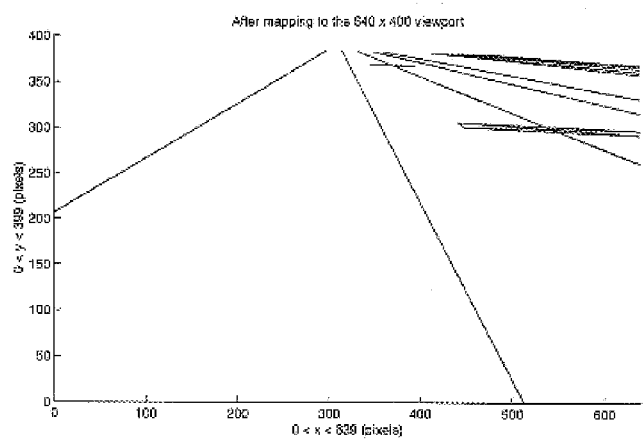
FIG. 34 illustrates the view after hypothetical mapping to a viewport.
Figure 35:
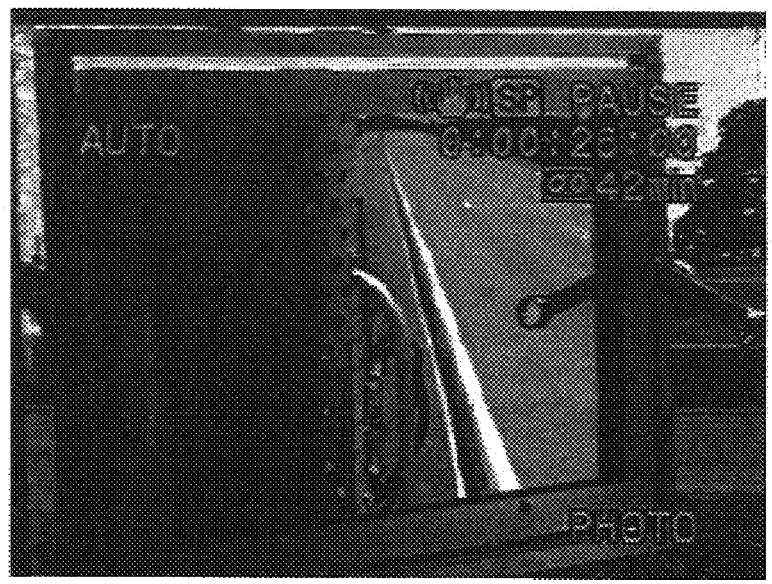
FIG. 35 illustrates a camera image of a mirror.

The mirror transformation stops with the projection. The last stage, viz. mapping to the viewport is not carried out. If the 2D projected view of FIG. 33 was mapped to a 2D, 640×400 pixel viewport using the same viewport transformation $M_{Viewport}$ as in the forward transformation (Equation 43), the viewport would look like FIG. 34. Comparing this figure to FIG. 35 which is an image taken by the camera, it can be seen that the computer graphics image portrayed by FIG. 34 is similar to the camera image shown in FIG. 35, but does not match up exactly.

Stencil Transformation

As noted with respect to the mirror transformation, directly mapping the projected view to the viewport does not give the desired result. The 2D rectangle of the projected view needs to be mapped to the 2D rectangle of the mirror. To this effect, the projected view area bounded by −1<x<1 and −1<y<1 is first scaled up to the mirror dimensions. Given that:

$$halfwidth = \frac{MIRROR(2) - MIRROR(1)}{2} \quad \text{Eq. 64}$$

$$halfheight = \frac{MIRROR(4) - MIRROR(3)}{2} \quad \text{Eq. 65}$$

where, MIRROR(n), n=1, 2, 3 and 4 are the 4 elements of the 4×1 vector MIRROR as given by Equation 57, the scaling matrix is:

$$S_{Mirror} = \text{Scale (halfwidth, halfheight, 0)} \quad \text{Eq. 66}$$

Next, the origin (0,0) of this scaled view is translated to the center of the mirror 204. The center of the mirror 204 in $X_{Mirror}$ coordinates is:

$$CM = \left[\begin{array}{cccc} \dfrac{MIRROR(1) + MIRROR(2)}{2} & \dfrac{MIRROR(3) + MIRROR(4)}{2} & 0 & 1 \end{array}\right]' \quad \text{Eq. 67}$$

Translating to this point is achieved by:

$$T_{Mirror} = Trans(CM(1), CM(2), CM(3)) \quad \text{Eq. 68}$$

where CM(n), n=1, 2, 3 are the nth elements of the 4×1 vector CM given by Equation 67.

The above scaling and translation are with respect to $X_{Mirror}$ (mirror) coordinates. To bring them to world coordinates requires premultiplication by $X_{Mirror}$. Hence the complete stencil transformation is $X_{Stencil}$, where:

$$X_{Stencil} = X_{Mirror} \cdot T_{Mirror} \cdot S_{Mirror} \quad \text{Eq. 69}$$

Figure 36:
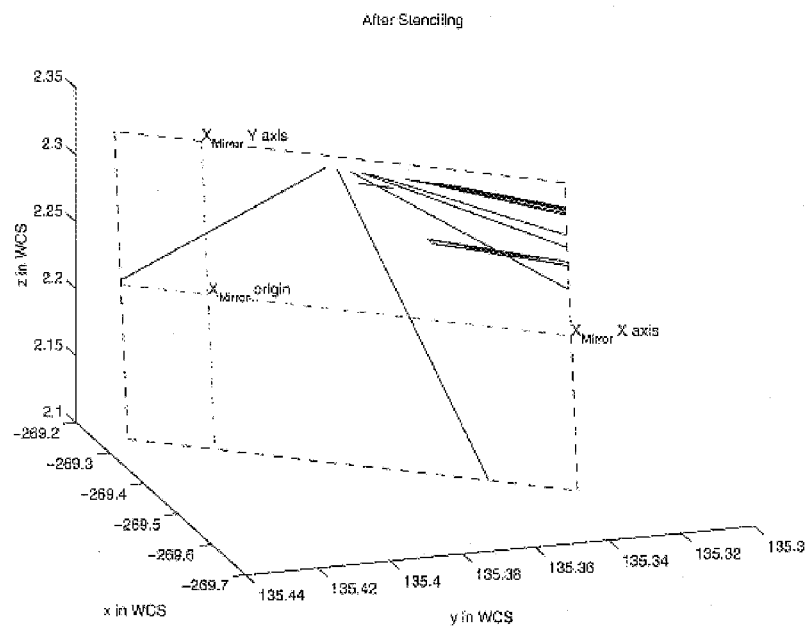
FIG. 36 illustrates the reflective points captured by the stencil outline lying in the 2 dimensional mirror plan in the World Coordinate System.
Figure 37:
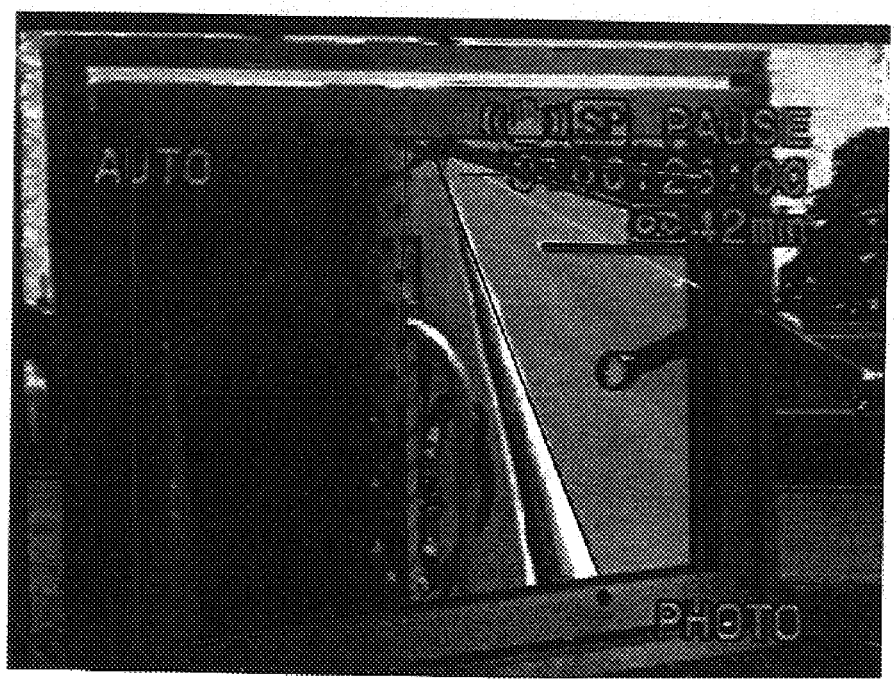
FIG. 37 illustrates a camera view, with the virtual mirror overlaid.

To summarize, the stencil transformation is a simple 2D space to 2D space transformation. It transforms the 2D projected view of the mirror transformation of FIG. 33, to the 2D space as shown in FIG. 36. Once this is done, the points can be treated like ordinary points in the forward field of view, i.e. they can undergo the entire sequence of the forward transformation and finally be mapped to the viewport. FIG. 37 shows that the images now match precisely. The virtual mirror is superimposed over the actual mirror image. It can be seen that the lane boundaries hidden by the exhaust stack can easily be seen.

Trivial Rejection

The scene displayed by the virtual mirror consists of lines. Each line has to be transformed, clipped and projected. Transformation consists of multiplying each of the two 4×1 endpoints with a 4×4 transformation matrix. The line is then clipped against the six faces of the perspective canonical volume by the Liang-Barsky algorithm. Next it is projected, which involves multiplying the endpoints by the 4×4 projection matrix followed by homogeneous division.

These computations are expensive to perform. If the line lies far away from the host vehicle, so that it may not even be inside the original viewing volume, or if it is inside the viewing volume but too far away to substantially affect the final rendered view, then the line can optionally be rejected before the computations rather than going through the computations and then being rejected.

To accomplish this, a 2D rectangular clipping region is introduced around the host vehicle 122. This rectangular region lies in the XY plane of the World Coordinate System (WCS) and the edges of the rectangular region are parallel to the X and Y axes of the WCS. For purposes of this discussion, an arbitrary 1 km×1 km square clipping region centered around the host vehicle GPS antenna 28 has been chosen, however any rectangular region can be used.

The elevation data (Z coordinate) of the line endpoints, if any, is ignored. All the lines are examined to see if they can be "trivially rejected" by the known Cohen-Sutherland algorithm against the rectangular clipping region.

Figure 38:
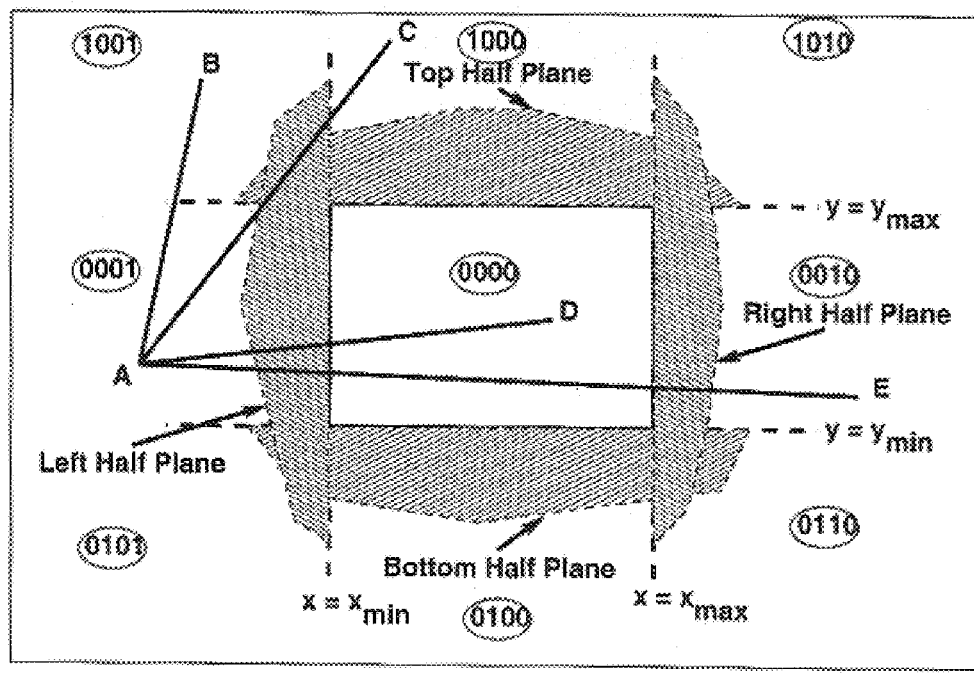
FIG. 38 illustrates a rectangular clipping region.

As can be seen from FIG. 38, each of the four sides of the rectangular clipping region forms the bounding side of a semi-infinite half plane. Lines with both endpoints lying in the same half plane are trivially rejected. Hence the algorithm trivially rejects line AB. Line AC cannot be trivially rejected by the algorithm even though it clearly lies outside the rectangular clipping region, because its endpoints lie in different half planes. Lines AD and AE clearly cannot be trivially rejected.

The Cohen-Sutherland algorithm has a trivial rejection portion which can be used for line clipping. Only lines which can be trivially rejected are precluded from the transformation, clipping and projection stages.

The four sides of the rectangular clipping region divide the plane outside the clipping region into nine areas. Each area is identified by a four bit "outcode". A line endpoint lying in a particular area is assigned the same outcode as the area. If the logical AND of the outcodes of the line endpoints is not zero, then the line is trivially rejected.

To compute the endpoint outcode, the four bits comprising the outcode are set as per Table 2.

TABLE 2

Endpoint condition to set the four bits of the outcode.

| Bit | Endpoint condition |
| --- | --- |
| First bit (Most Significant Bit) | lies in top half plane, $y > y_{max}$ |
| Second bit | lies in bottom half plane, $y < y_{min}$ |
| Third bit | lies in right half plane, $x > x_{max}$ |
| Fourth bit (Least Significant Bit) | lies in left half plane, $x < x_{min}$ |

Using Table 2, the endpoint outcodes for lines AB, AC, AD and AE shown in FIG. 38 are computed and listed in column 2 of Table 3. Column 2 also shows the result of the binary AND of the outcodes. If the binary AND is not zero, then the line is to be trivially rejected as shown in column 3 of Table 3.

TABLE 3

Example of trivial rejection test 5 for lines AB, AC, AD and AE.

| Line | outcode (endpoint1) & outcode (endpoint2) | Trivially reject ? |
| --- | --- | --- |
| AB | 0001 & 1001 = 0001 | Yes |
| AC | 0001 & 1000 = 0000 | No |
| AD | 0001 & 0000 = 0000 | No |
| AE | 0001 & 0010 = 0000 | No |

Computing an outcode consists of testing four floating-point differences. Examining for trivial rejection consists of testing the result of the binary AND operation performed on the two outcodes. Hence the trivial rejection algorithm can be performed very quickly.

Matrix Optimization

In one embodiment, to reduce rendering time, a matrix optimization is performed. The line endpoints (represented by two 4×1 coordinate vectors) are then multiplied by 4×4 matrices using C code constructs. This makes the code highly repetitive and very fast. Another optimization is to avoid multiplying the last row of the homogeneous transformation matrices, since the last row is always [0 0 0 1]. This reduces the multiplication of a 4×4 homogeneous transformation matrix with a 4×1 coordinate vector to 12 multiplications and 9 additions instead of 16 multiplications and 12 additions.

This brings down the time taken to transform vertices to about 10 ms per frame and the time required to draw one frame to between 33 and 65 ms, averaging 40 ms per frame.

Embodiment Using APIs

An alternative embodiment of the present invention will now be discussed in which graphics APIs are used. One illustrative embodiment uses OpenGL, although others could be used as well. Open GL is a low-level graphics API and is a standard for 3D graphics and includes a mirror implementation and is described in T. Hall, A How To For Using OpenGL to Render Mirrors, posting to comp.graphics.api.opengl, August, 1996.

The 3D scene in OpenGL is manipulated via two matrices—the projection matrix and the modelview matrix. The projection matrix allows the user to apply a perspective or orthographic projection. If a perspective projection is used, the user specifies a frustrum shaped viewing volume, by specifying the left, right, bottom, top, near and far parameters. The modelview matrix, so called because a transformation applied to a model in the scene is equivalent to applying the inverse of the transformation to the point of view, is used to place models and the viewpoint in the scene.

The modelview matrix defines the current coordinate system. All drawing primitives such as lines and polygons are then drawn with respect to this coordinate system. The coordinate system can be translated, rotated or scaled to another coordinate system by means of the function calls glTranslate, glRotate and glScale respectively. These function calls are highly optimized and hardware accelerated because they need to be called for millions of polygon vertices. Hardware acceleration means that the CPU no longer need perform the repetitive matrix multiplication operations on the vertices, this is done by the graphics accelerator.

In addition, if the graphics card is of the AGP variety, then the graphics card is mounted on a port on the motherboard, with which it communicates directly. Hence the standard PCI bus is spared the high bandwidth communication between the CPU and the graphics card and can perform other I/O tasks more efficiently. AGP is twice as fast as the PCI bus, and the current AGP 4× is 8 times as fast as the PCI bus.

Graphics cards also have a double buffer, which means that the screen need not wait for the graphics card to compute the pixel data. Rather, the graphics card performs the calculations and updates a second buffer that is not visible to the user. When the buffer update is complete, the graphics card instantly swaps this buffer with the one that the user is currently seeing. This gives the feeling of smooth, connected flow between the frames.

Complex models that do not distort internally can be stored in precompiled byte code called display lists. The computations performed on the vertices within the model are stored while compiling the list and when the list is subsequently redrawn, only the results of the computations are accessed and rendered. This feature increases the frame refresh rates.

Each 3D line or polygon vertex has a depth, usually a 32-bit value. OpenGL performs a sort on depth to correctly occlude the vertex of greater depth (lying farther away from the viewpoint), whenever two vertices compete for the same pixel. It helps to have this sorting hardware accelerated.

Other features in OpenGL include an 8-bit α channel per pixel in addition to the 24-bit red, green, blue (RGB) value. This α channel determines the transparency of each pixel and allows blending a destination pixel with a transparent source pixel to give a "see-through" effect. OpenGL also includes texture mapping, which allows a bitmap loaded from a file to be mapped onto an arbitrarily shaped polygon. This adds realistic, life-like quality to the scene. Graphics cards can have textures resident in their memory instead of on conventional RAM. This significantly speeds up the drawing of textures.

The most important OpenGL feature from the point of view of the virtual mirror application is the stencil buffer. A stencil is like a mask, and one can specify whether to draw to the stencil or around it. The number of stencils that can be used is controlled by the number of stencil bits in the stencil buffer. For 8 stencil bits, $2^8-1=255$ different stencils are available.

The entire environment is set up in the Windows® environment via the following structure:

```
static PIXELFORMATDESCRIPTOR pfd = {
    sizeof (PIXELFORMATDESCRIPTOR),     // Size of this structure
    1,                                   // Version of structure
    PFD_DRAW_TO_WINDOW |                 // Draw to Window
                                         // (not to bitmap)
    PFD_SUPPORT_OPENGL |                 // Support OpenGL calls
    // PFD_GENERIC_ACCELERATED |         // OpenGL MCD (vs ICD),
                                         // works only on NT
    PFD_DOUBLEBUFFER,                    // Double buffered mode
    PFD_TYPE_RGBA,                       // RGBA Color mode
    32,                                  // Want 24bit color
    0,0,0,0,0,0,                         // Not used
    0,0,                                 // Not used
    0,0,0,0,0,                           // Not used
    24,                                  // Size of depth buffer
    8,                                   // Size of stencil buffer
    0,                                   // Not used
    PFD_MAIN_PLANE,                      // Draw in main plane
    0,                                   // Not used
    0,0,0};                              // Not used
```

The actual OpenGL code is quite simple. The basic procedure is as follows:

1. Define a stencil, instructing that when it is drawn, the stencil bits be set to 1.
2. Set up the modelview matrix to equal the mirror coordinate system ($X_{Mirror}$ of Equation 52).
3. Draw the stencil, which is a quadrilateral, representing the virtual mirror.
4. Next, only the stenciled portion (where the stencil bit is set to 1) is marked active, so that all the drawing commands that follow are restricted to the inside of the stencil and the lines and polygons that extend beyond the stencil edges will get clipped.
5. The modelview matrix is set up to equal the mirror transformation ($R_{Mirror}$, Eq. 51).
6. Render the entire scene. This creates the view in the mirror.
7. Set up the modelview matrix for the forward-looking view.
8. Only the non-stenciled portion (where the stencil bit is not set to 1) is marked active, so that all the drawing commands that follow are restricted to the outside of the stencil and the lines and polygons that extend inside the stencil edges will get clipped.
9. Render the entire scene. This creates the forward-looking view.

The following code snippet gives this entire algorithm in almost as many lines of code. All lines following a "//" or enclosed between a "/*" and a "*/" are comments.

```
glPushMatrix( );    // save the World Coordinate
                    // System (WCS)
// ... Step 1 of 9 ...
// Dont update colour or depth
glDisable(GL_DEPTH_TEST);
glColorMask(GL_FALSE, GL_FALSE, GL_FALSE, GL_FALSE);
// Draw 1 into the stencil buffer.
glEnable(GL_STENCIL_TEST);
glStencilFunc(GL_ALWAYS, 0x1, 0x1);
glStencilOp(GL_REPLACE, GL_REPLACE, GL_REPLACE);
// ... Step 2 of 9 ...
GoRelative (xMirror);
// ... Step 3 of 9 ...
// Draw the physical stencil
// mirror pixels just get their stencil set to 1. */
glCallList (LST_MIRROR_QUAD);   // a quadrilateral mirror
glPopMatrix( );     // restore WCS
// ... Step 4 of 9 ...
// Draw the virtual world
glPushMatrix( );    // save the WCS
/* Re-enable update of color and depth. */
glColorMask(GL_TRUE, GL_TRUE, GL_TRUE, GL_TRUE);
glEnable(GL_DEPTH_TEST);
/* Now, only render where stencil is set to 1. */
glStencilFunc(GL_EQUAL, 0x1, 0x1);  /* draw if ==1 */
glStencilOp(GL_KEEP, GL_KEEP, GL_KEEP);
// ... Step 5 of 9 ...
// Reflection = $X_{Mirror} \cdot Scale(1,1,-1) \cdot X^{-1}_{Mirror}$
GoRelative (Reflection);
// ... Step 6 of 9 ...
glCallList(LST_MNROAD);  // Render the road
glPushMatrix( );  // save coordinate system
GoRelative (GPSAntenna);  // change coordinate system
glCallList (LST_VEHICLE);  // Render host vehicle
glPopMatrix( );    // restore coordinate system
glPushMatrix( );
    GoRelative (Car1);
glCallList(LST_PORSCHE);   // Render sensed object vehicle
glPopMatrix( );
// ... Step 7 of 9 ...
glPopMatrix( ); // restore WCS
// ... Step 8 of 9 ...
glStencilFunc(GL_NOTEQUAL, 0x1, 0x1); /* draw if !=1 */
glStencilOp(GL_KEEP, GL_KEEP, GL_KEEP);
// ... Step 9 of 9 ...
--- repeat step 6 of 9, line for line ---
```

In addition to the above basic algorithm, there are two refinements. First, the vertex normals need to be reversed when drawing polygons in the mirror view. This is because instead of viewing the front surfaces of the polygons as in the forward view, the rear surfaces of the polygons are now visible in the mirror view. This means that the surface that has to be culled (eliminated because it is not visible from the viewpoint) is the front surface. This automatic computation of the reversed normals and culling of the front face of the polygons instead of the rear face is achieved by:

glEnable(GL_NORMALIZE);

glCullFace(GL_FRONT);

Second, the virtual world needs to be clipped at the mirror plane. The mirroring transformation reflects all vertices about the mirror plane. Therefore, vertices on the reflecting side get reflected to the rear side of the mirror and then are rendered like ordinary vertices, after reversal of normals and front face culling. This is desired. However, vertices lying behind the mirror also get reflected about the mirror plane to the front (reflecting) side of the mirror. This is not problematic if the vertices do not lie between the viewpoint and the mirror, but if they do, they will occlude the mirror. This is not desired. Hence the virtual world is split into two infinite halves by the mirror plane, and the virtual world lying on the reflecting side of the mirror plane must be discarded. This is achieved by OpenGL clipping planes. The mirror plane is defined by the equation:

$$ax+by+cz+d=0 \quad \text{Eq. 70}$$

where the constants a, b, c are the normalized vector components of the normal to the mirror plane (the Z axis of the Mirror Coordinate System) with respect to the World Coordinate System, and the constant d is the distance of the plane from the origin of the World Coordinate System.

Vector mathematics reveals that if the normal to the plane is outward (points away from the origin of the World Coordinate System), then d is the negative of the dot product of the unit normal to the mirror plane and the origin of the Mirror Coordinate System. Hence, if the Mirror Coordinate System is given by the homogeneous transformation matrix $X_{Mirror}$, where $$X_{Mirror} = \begin{bmatrix} x1 & y1 & z1 & d1 \\ x2 & y2 & z2 & d2 \\ x3 & y3 & z3 & d3 \\ 0 & 0 & 0 & 1 \end{bmatrix} \quad \text{Eq. 71}$$

Then, $$a=z1 \quad \text{Eq. 72}$$

$$b=z2 \quad \text{Eq. 73}$$

$$c=z3 \quad \text{Eq. 74}$$

$$d=-(z1 \cdot d1+z2 \cdot d2+z3 \cdot d3) \quad \text{Eq. 75}$$

The clipping plane is now specified by the following code:

```
GLdouble planeEqn[4] = { a, b, c, d };
glEnable( GL_CLIP_PLANE0 );      // Enable clipping
    glClipPlane( GL_CLIP_PLANE0, planeEqn );
```

Figure 39:
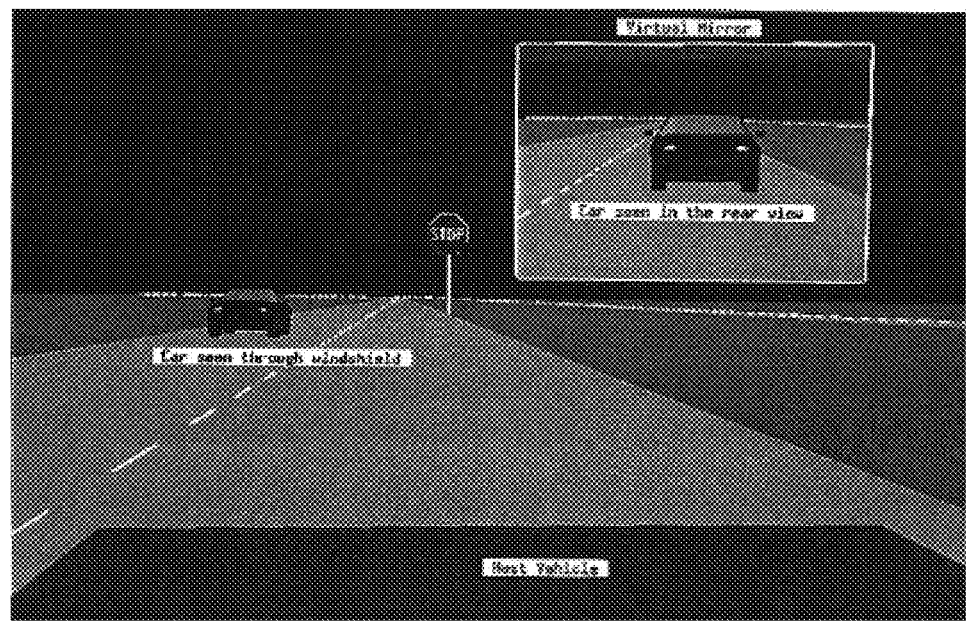
FIG. 39 is an illustration of a virtual mirror in accordance with another embodiment of the present invention.

One representation of the virtual mirror, along with the forward-looking view is shown in FIG. 39. The rectangle on the upper right hand corner is the virtual mirror. The octagonal stop sign is actually created from a 128×128 square bitmap. The edges of the square are shaved off by assigning an α value of 0 to the pixels that form the edge, thereby making the pixels transparent.

It can thus be seen that the present invention provides a vision assist device in the form of a virtual mirror. The virtual mirror addresses many of the disadvantages associated with conventional mirrors without the drawbacks of prior art techniques for addressing those disadvantages.

It should also be noted that the mirror representation can be manipulated as desired. For instance, any desired mirror optics (such as concave, convex) can be produced. Similarly, different parts of the mirror representation can emulate different mirror optics. Also, the mirror optics can change dynamically based on substantially any desired parameter. Thus, for example, the mirror can be flat when objects are closer, but convex when they are further away.

Further, the present virtual mirror can be rendered over the top of a mirror with moving portions darkened and positioned to dull the glare from headlights or glare from the sun. Such an embodiment can be formed using an LCD film that selectively blackens areas based on sensed light or based on an estimate of glare from the sun or other vehicles based on the position and orientation of the host vehicle relative to the sun or other vehicle.

Similarly, the present virtual mirror display can be controlled to oscillate slightly, at a desired frequency, to give an indication of depth.

Similarly, the position of the display 22 can be sensed. Changes in the position of the display 22 are fed back to controller 12. Controller 12 factors in these changes and changes the virtual mirror displayed much the same as the view through a mirror changes as the mirror is moved.

Also, though the present mirror display can be used to present a mirror display of items which would otherwise be obstructed by the vehicle body itself, the vehicle body is not displayed. However, the vehicle body can be rendered in the display in outlined form so the driver can see the position of the vehicle body relative to the items in the mirror display. This may be particularly helpful when moving the vehicle through tight spaces or when backing up.

Further, the present invention can be enhanced with audio or haptic feedback. For example, if the driver moves the host vehicle too close to a detected object or lane boundary, a voice, scraping sound, or other sound can be generated. Similarly, haptic feedback, such as that provided by (1) a vibrating seat which allows for control of the amplitude, frequency and position of the vibration or motion across the seat surface, or (2) a steering wheel which has a torque function applied to it to provide a position dependent signal to the driver's hands. This signal can be a vibrational wave that directs the driver to turn right or left. The source of sound or vibration can be positioned to indicate the direction of the detected object or lane boundary.

In addition, the mirror display can be enhanced as well. For instance, as detected objects draw near, they can be displayed differently, such as flashing or in a different color, etc.

Although the present invention has been described with reference to preferred embodiments, workers skilled in the art will recognize that changes may be made in form and detail without departing from the spirit and scope of the invention.

What is claimed is:

1. A method of generating a display on a mobile body, comprising:

obtaining position information including coordinates that are indicative of a position of the mobile body on the surface of the Earth;

obtaining display data indicative of items in proximity to the mobile body based on the position information;

generating a virtual mirror display of the items that would be seen in a mirror with an unobstructed view based on the display data.

2. The method of claim 1 wherein generating a virtual mirror display comprises:

performing a mirror transformation on the display data, the mirror transformation transforming the display data into reflected data indicative of a reflection of the items.

3. The method of claim 2 wherein generating a virtual mirror display comprises:

performing a stencil transformation on the reflected data to obtain stencil data indicative of conformance of the reflected data to a simulated physical mirror boundary.

4. The method of claim 3 wherein generating a virtual mirror display comprises:

performing a forward transformation on the stencil data to obtain perspective data indicative of the stencil data in perspective on the virtual mirror display.

5. The method of claim 4 wherein generating a virtual mirror display comprises:

rendering the virtual mirror display based on the perspective data.

6. The method of claim 5 wherein generating a virtual mirror display comprises:

prior to performing the mirror transformation, determining whether the display data is indicative of an item that will be displayed.

7. The method of claim 6 wherein generating a virtual mirror display comprises:

if the display data is indicative of an item that will not be displayed, selecting other display data prior to performing the mirror transformation.

8. The method of claim 7 wherein generating a virtual mirror display comprises:

representing lines or object surface boundaries in the virtual mirror display by coordinate vectors; and mathematically transforming the coordinate vectors to create visual representations of objects.

9. The method of claim 1 wherein obtaining position information comprises:

obtaining mobile body orientation data indicative of an orientation of the mobile body.

10. The method of claim 1 wherein obtaining display information comprises:

accessing a geospatial database based on the position information.

11. The method of claim 10 wherein obtaining display information comprises:

sensing objects proximate to the mobile body and not found in the geospatial database.

12. The method of claim 11 wherein the mobile body comprises a motor vehicle and wherein generating a virtual mirror display comprises:

generating the virtual mirror display as a rearview mirror on the motor vehicle displaying items obstructed from view by the motor vehicle.

13. The method of claim 1 and further comprising:

obtaining object information indicative of location of an object proximate the mobile body; and generating the virtual mirror display based on the object information.

14. The method of claim 1 further comprising:

obtaining virtual mirror data indicative of spatial characteristics of the virtual mirror; and generating the virtual mirror display based on the virtual mirror data.

15. The method of claim 14 wherein obtaining virtual mirror data comprises:

obtaining location, orientation, shape and size data indicative of a desired location, orientation, shape and size of the virtual mirror.

16. The method of claim 1 wherein obtaining virtual mirror data comprises:

obtaining virtual mirror data indicative of optical characteristics of the virtual mirror.

17. The method of claim 1 and further comprising:

obtaining user information indicative of an orientation of a user viewing the virtual mirror display; and modifying the virtual mirror display based on changes in the user information.

18. The method of claim 17 wherein obtaining user information comprises:

tracking user eye orientation.

19. The method of claim 17 wherein obtaining user information comprises:

tracking user head orientation.

20. The method of claim 1 wherein generating a virtual mirror display comprises:

displaying the items differently based on a position of the items relative to the mobile body.

21. The method of claim 20 wherein displaying the items differently comprises:

changing a visual characteristic of the items based on a distance the items are from the mobile body.

22. The method of claim 20 wherein displaying the items differently comprises:

changing an attribute of the virtual mirror.

23. The method of claim 22 wherein changing an attribute of the virtual mirror comprises:

dynamically changing a computed radius of curvature of the virtual mirror in generating the virtual mirror display.

24. The method of claim 23 wherein changing an attribute of the mirror comprises:

changing the virtual mirror between, flat, concave and/or convex.

25. The method of claim 23 wherein dynamically changing a radius of curvature comprises:

changing the computed radius of curvature of different portions of the mirror such that the different portions have different radii of curvature.

26. The method of claim 1 wherein generating a virtual mirror display comprises:

generating a rendering of the items.

27. The method of claim 1 wherein generating a virtual mirror display comprises:

generating a plurality of virtual mirror displays.

28. The method of claim 1 wherein generating a virtual mirror display comprises:

generating a display element representative of the items.

29. The method of claim 1 wherein generating a virtual mirror display comprises:

selectively suppressing light reflection that would otherwise be seen in the virtual mirror display.

30. The method of claim 1 wherein generating a virtual mirror display comprises:

oscillating display of the items in the virtual mirror display to create depth.

31. The method of claim 1 and further comprising:
obtaining item information, indicative of physical characteristics of the items in proximity to the mobile body, by wireless transmission from the items.

32. The method of claim 31 wherein the items in proximity to the mobile body are motor vehicles having vehicle identification numbers (VINs) and wherein the vehicles transmit the VIN using wireless transmissions.

33. The method of claim 32 wherein a portion of the VIN is used to recreate a shape of the vehicle for display.

34. The method of claim 33 and further comprising:
accessing a database based on the portion of the VIN, and returning data indicative of the shape of the vehicle.

35. The method of claim 34 wherein generating a virtual mirror display comprises:
displaying the shape of the vehicle based on the data indicative of the shape.

36. The method of claim 31 wherein the physical characteristics comprise position and orientation of other mobile bodies.

37. The method of claim 1 and further comprising:
generating an alarm based on a position of the items relative to the mobile body.

38. The method of claim 1 wherein generating a virtual mirror display comprises:
rendering the display on a flat panel display.

39. The method of claim 1 and further comprising:
providing a stimulation output to stimulate a sense modality of a user based on a position of an item relative to the mobile body.

40. The method of claim 1 wherein generating a virtual mirror display comprises:
invoking exposed three dimensional graphics programming interfaces.

41. The method of claim 40 wherein invoking comprises:
defining a stencil to be drawn.

42. The method of claim 41 wherein invoking exposed programming interfaces further comprises:
defining a mirror coordinate system using a model view matrix.

43. The method of claim 42 wherein invoking further comprises:
rendering the stencil; and
activating portions of the stencil.

44. The method of claim 43 wherein invoking further comprises:
defining the model view matrix as a mirror transformation; and
rendering a mirror view based on the model view matrix.

45. The method of claim 44 wherein invoking further comprises:
defining the model view matrix as a forward-looking view;
activating different portions of the stencil; and
rendering the forward-looking view behind the virtual mirror.

46. A display system for generating a display on a mobile body, the display system comprising:
a location system generating location data including coordinates that are indicative of a location of the mobile body on the surface of the Earth;
a geospatial database storing display item information indicative of items to be displayed;
a display device; and
a controller coupled to the location system, the display device, and the geospatial database and configured to access the geospatial database based on the location data and output display data to the display device indicative of a virtual mirror display of the items.

47. The display system of claim 46 wherein the display device comprises a flat panel display.

48. The display system of claim 46 wherein the display device comprises a head mounted display.

49. The display system of claim 46 and further comprising:
a projector receiving the display data and projecting the virtual mirror display on the display device.

50. The display system of claim 46 and further comprising:
a ranging system, coupled to the controller, generating object data indicative of objects proximate the mobile body.

51. The display system of claim 50 wherein movement of the display device changes the virtual mirror display and the ranging system to generate object data based on a new virtual mirror display determined by a new position or orientation of the display device.

52. The display system of claim 46 and further comprising:
an imaging system, coupled to the controller, generating object data indicative of physical characteristics of objects proximate the mobile body.

53. The display system of claim 52 wherein the physical characteristics comprise at least one of shape, size and color.

54. The display system of claim 46 wherein the controller is configured to output the display data indicative of objects in the virtual mirror display.

55. The display system of claim 54 wherein the controller is configured to perform a mirror transformation on the display data, the mirror transformation transforming the display data into reflected data indicative of a reflection of the items.

56. The display system of claim 55 wherein the controller is configured to perform a stencil transformation on the reflected data to obtain stencil data indicative of conformance of the reflected data to a boundary of a mirror positioned or oriented in a desired way.

57. The display system of claim 56 wherein the controller is configured to perform a forward transformation on the stencil data to obtain perspective data indicative of the stencil data in proper perspective on the virtual mirror display.

58. The display system of claim 57 wherein the controller is configured to render the virtual mirror display based on the perspective data.

59. The display system of claim 46 wherein the controller is configured to sense a change in orientation of the display device and modify the display data based on the change in orientation of the display device.

60. The display system of claim 46 wherein the controller is configured to provide the display data as being indicative of the items and outlined portions of the mobile body that would otherwise obstruct a mirror view of the items.

61. A computer generated virtual mirror display on a mobile body, comprising:
a vehicle location system configured to generate a location signal including coordinates of a position of the mobile body on the surface of the Earth;
a geospatial database including road data, the road data including road boundary information corresponding to a boundary of a road on which the mobile body is traveling;
a conformal virtual mirror display configured to display a virtual image representing the boundary of the road based on the road boundary information and the location signal;
wherein the virtual image is displayed in a manner that generates a visual effect of the virtual image substantially overlying the corresponding boundary of the road that would be seen if the display were a mirror having an unobstructed view of the road.

62. The computer generated display of claim 61 wherein the display comprises:
a conformal mirror display of items that would be seen in a mirror mounted on the vehicle if the view were unobstructed.

63. The computer generated display of claim 62 wherein the items comprise:
road lane boundaries.

64. The computer generated display of claim 63 wherein the items comprise:
sensed objects proximate to the mobile body.

65. The computer generated display of claim 64 wherein the sensed objects comprise:
other mobile bodies.

66. The computer generated display of claim 64 wherein the items comprise:
at least one of traffic signs, guard rails, other road furniture, and landmarks.

67. The computer generated display of claim 62 wherein the mirror display is superimposed on an actual mirror.

68. The computer generated display of claim 67 wherein the mirror display emphasizes desired portions of the display.

* * * * *

UNITED STATES PATENT AND TRADEMARK OFFICE
CERTIFICATE OF CORRECTION

PATENT NO. : 7,375,728 B2  
APPLICATION NO. : 09/968724  
DATED : May 20, 2008  
INVENTOR(S) : Donath et al.

Page 1 of 1

It is certified that error appears in the above-identified patent and that said Letters Patent is hereby corrected as shown below:

Column 18, line 20 change "$PRP_x$-0.127" to --$PRP_x$=0.127--.

Column 19, line 65 change "PRP-[0 0 0 1]'" to --PRP = [0 0 0 1]'--.

Column 26, line 55 after "in" insert --$X_{Mirror}$ coordinates is:

$$CM = \left[ \frac{MIRROR(1) + MIRROR(2)}{2} \quad \frac{MIRROR(3) + MIRROR(4)}{2} \quad 0 \quad 1 \right]'$$

Eq. 67--.

Signed and Sealed this

Thirtieth Day of December, 2008

JON W. DUDAS  
*Director of the United States Patent and Trademark Office*